United States Patent
Katsura et al.

[11] Patent Number: 5,951,220
[45] Date of Patent: Sep. 14, 1999

[54] SURFACE CUTTING METHOD AND APPARATUS FOR HOT-ROLLED STEEL PRODUCTS

[75] Inventors: Shigefumi Katsura; Atsushi Yuki; Masuto Shimizu; Toshiaki Amagasa, all of Chiba; Kanji Hayashi, Hiroshima; Shozo Tashiro, Hiroshima; Tetsuo Ichikizaki, Hiroshima, all of Japan

[73] Assignees: Kawasaki Steel Corporation, Kobe; Mitsubishi Jukogyo Kabushiki Kaisha, Tokyo, both of Japan

[21] Appl. No.: 08/809,554

[22] PCT Filed: Jul. 23, 1996

[86] PCT No.: PCT/JP96/02058

§ 371 Date: Mar. 21, 1997

§ 102(e) Date: Mar. 21, 1997

[87] PCT Pub. No.: WO97/03778

PCT Pub. Date: Feb. 6, 1997

[30] Foreign Application Priority Data

| Jul. 24, 1995 | [JP] | Japan | 7-187176 |
| Aug. 3, 1995 | [JP] | Japan | 7-198719 |
| Aug. 9, 1995 | [JP] | Japan | 7-203063 |
| Aug. 11, 1995 | [JP] | Japan | 7-205484 |
| Aug. 25, 1995 | [JP] | Japan | 7-217362 |
| Sep. 18, 1995 | [JP] | Japan | 7-238712 |

[51] Int. Cl.⁶ ............... B23C 3/14; B24B 49/00
[52] U.S. Cl. ............... 409/132; 409/139; 451/6
[58] Field of Search ............... 29/33 C, 33 A; 409/139, 132, 201; 451/5, 6

[56] References Cited

U.S. PATENT DOCUMENTS

| 3,676,959 | 7/1972 | Forster | 451/6 |
| 3,822,632 | 7/1974 | Chigotti | 409/139 X |
| 4,119,015 | 10/1978 | Tuda et al. | 409/201 |
| 4,197,043 | 4/1980 | Houghton | 409/139 |
| 4,633,620 | 1/1987 | Lorenzi et al. | 451/6 |
| 5,709,585 | 1/1998 | Matsuo et al. | 451/5 |

FOREIGN PATENT DOCUMENTS

| 2704814 | 8/1977 | Germany | 409/139 |
| 69088 | 6/1977 | Japan | 409/139 |
| A-53-112593 | 10/1978 | Japan . | |
| 115489 | 9/1979 | Japan | 409/139 |
| A-56-21712 | 2/1981 | Japan . | |
| A-57-91856 | 6/1982 | Japan . | |
| A-57-137008 | 8/1982 | Japan . | |
| U-58-191921 | 12/1983 | Japan . | |
| B2-60-33608 | 8/1985 | Japan . | |
| A-63-160707 | 7/1988 | Japan . | |
| U-64-20214 | 2/1989 | Japan . | |
| A-3-161212 | 7/1991 | Japan . | |
| A-5-23706 | 2/1993 | Japan . | |
| A-5-104261 | 4/1993 | Japan . | |

*Primary Examiner*—William Briggs
*Attorney, Agent, or Firm*—Oliff & Berridge, PLC

[57] ABSTRACT

A surface cutting method for a hot-rolled steel product that includes a joint portion having a predetermined breaking strength includes a step of clamping the steel product between a pair of milling cutters that are arranged on top and bottom surfaces of the steel product, while the steel product is conveyed in a longitudinal running direction. The top and bottom surfaces of the steel product are subjected to cutting by rotating the milling cutters in a rotating direction. A cutting resistance applied to the milling cutters during the cutting is determined based on parameters including type of steel, width, thickness, surface temperature and conveying speed of the steel product, as well as circumferential speed and cutting depth of the milling cutters. The cutting resistance is controlled by adjusting the cutting depth of the milling cutters by actuators connected to the milling cutters, such that a tension lower than the breaking strength of the joint portion is applied to the steel product by the cutting resistance, so as to prevent breakage of the joint portion during the cutting.

5 Claims, 36 Drawing Sheets

FIG_5

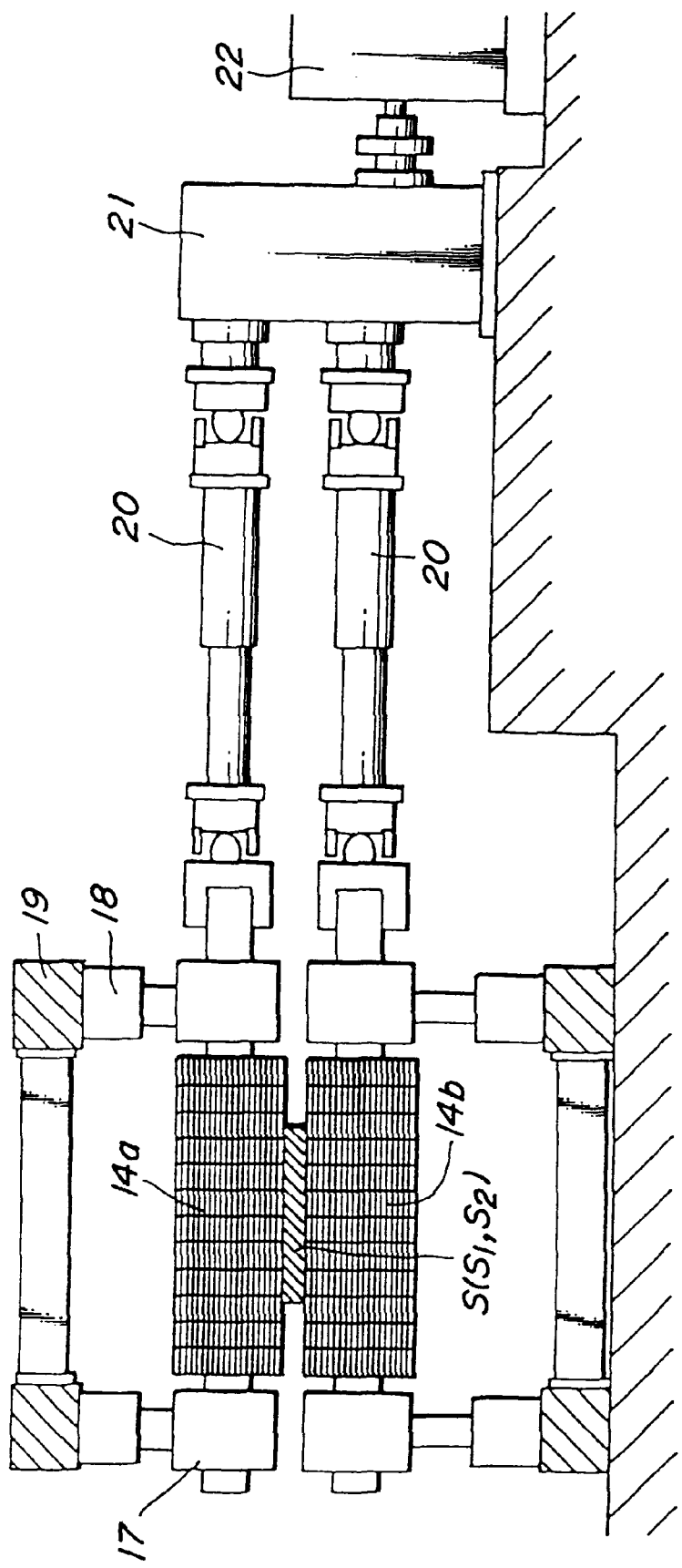

FIG_8
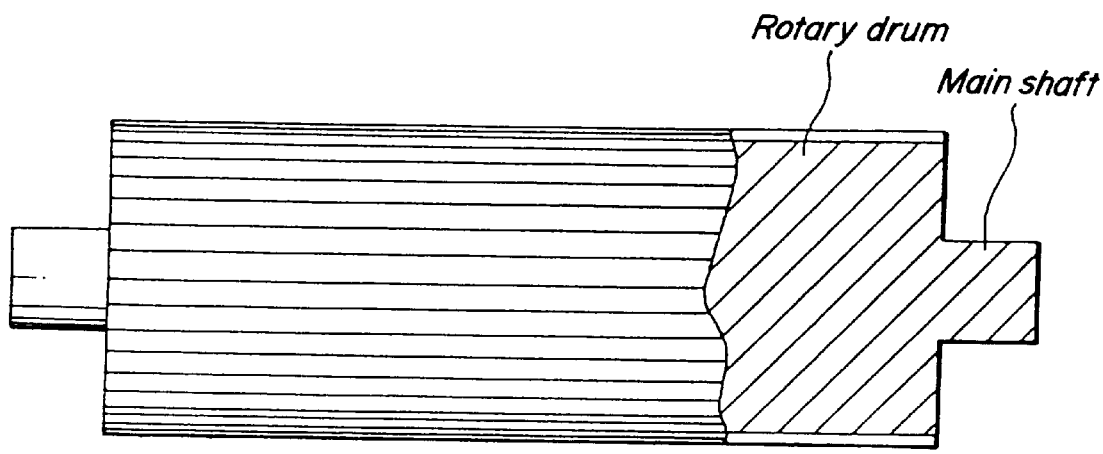
FIG_9
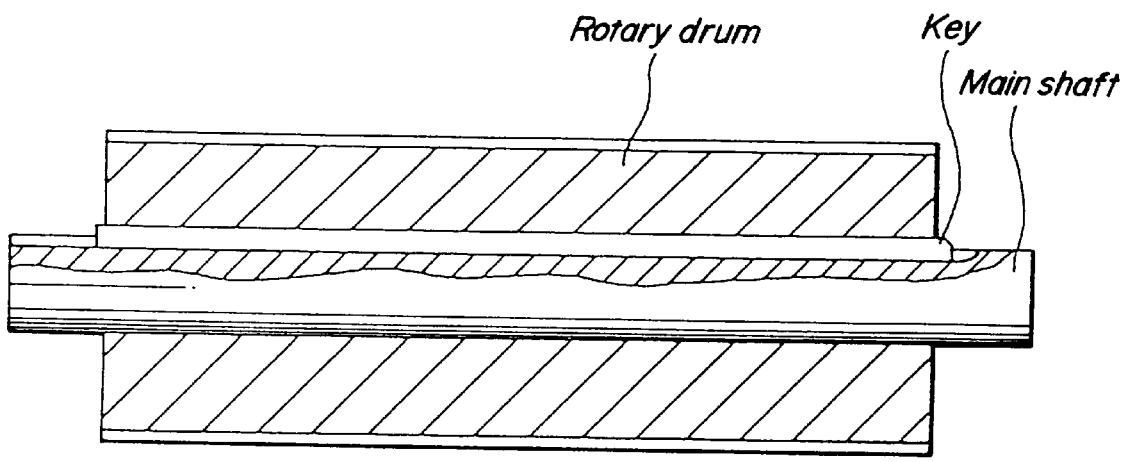

FIG_19
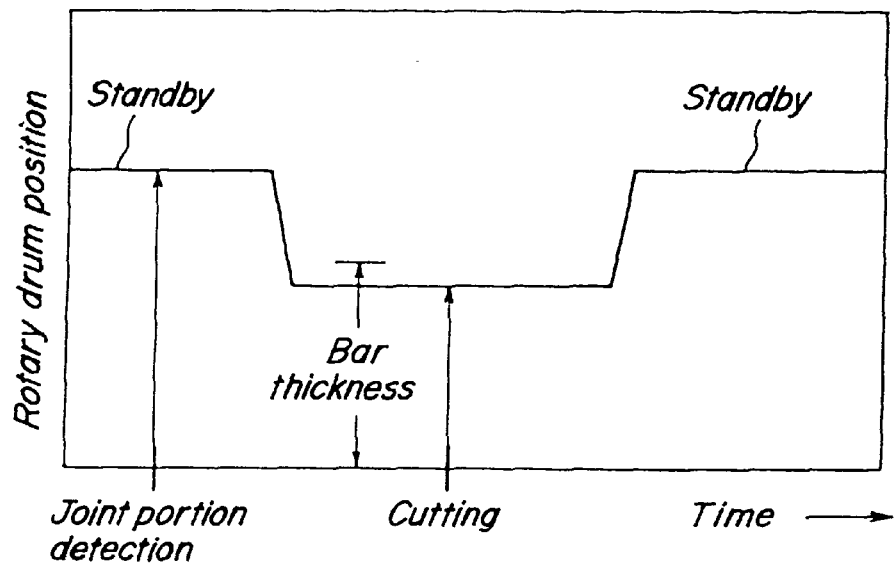
FIG_20
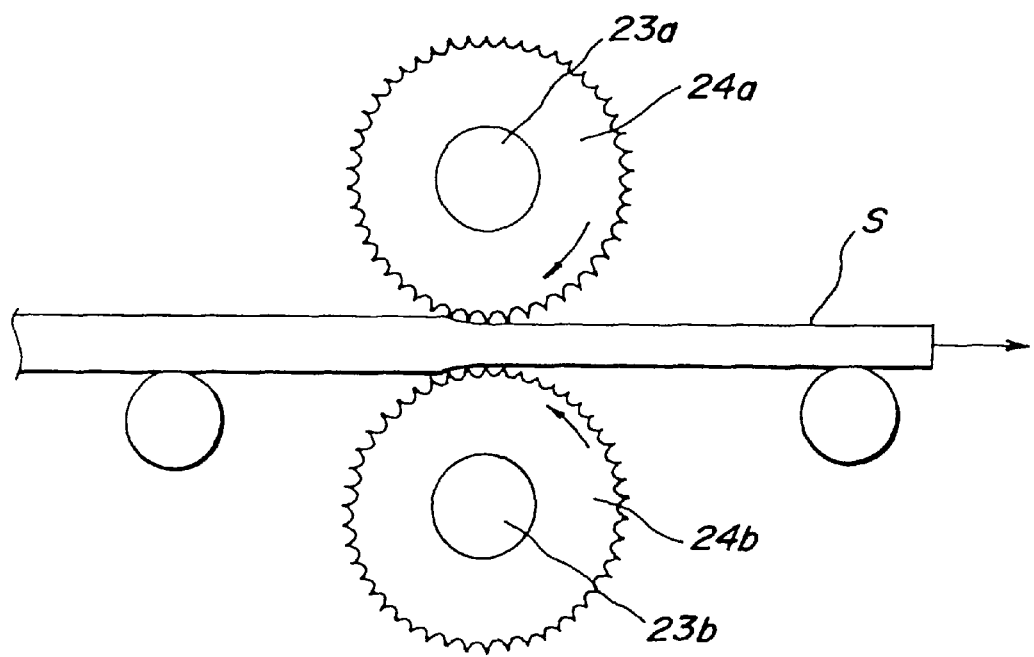

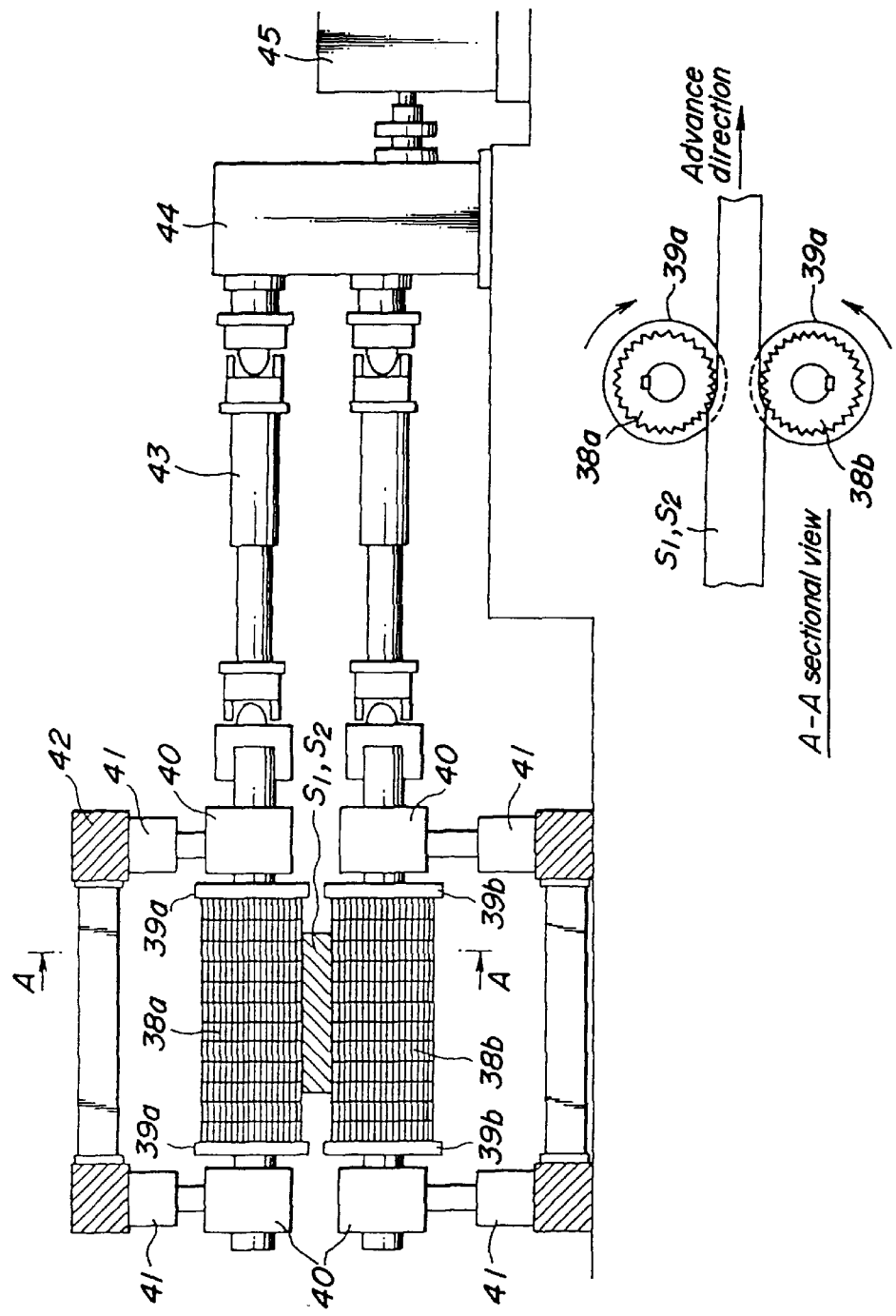

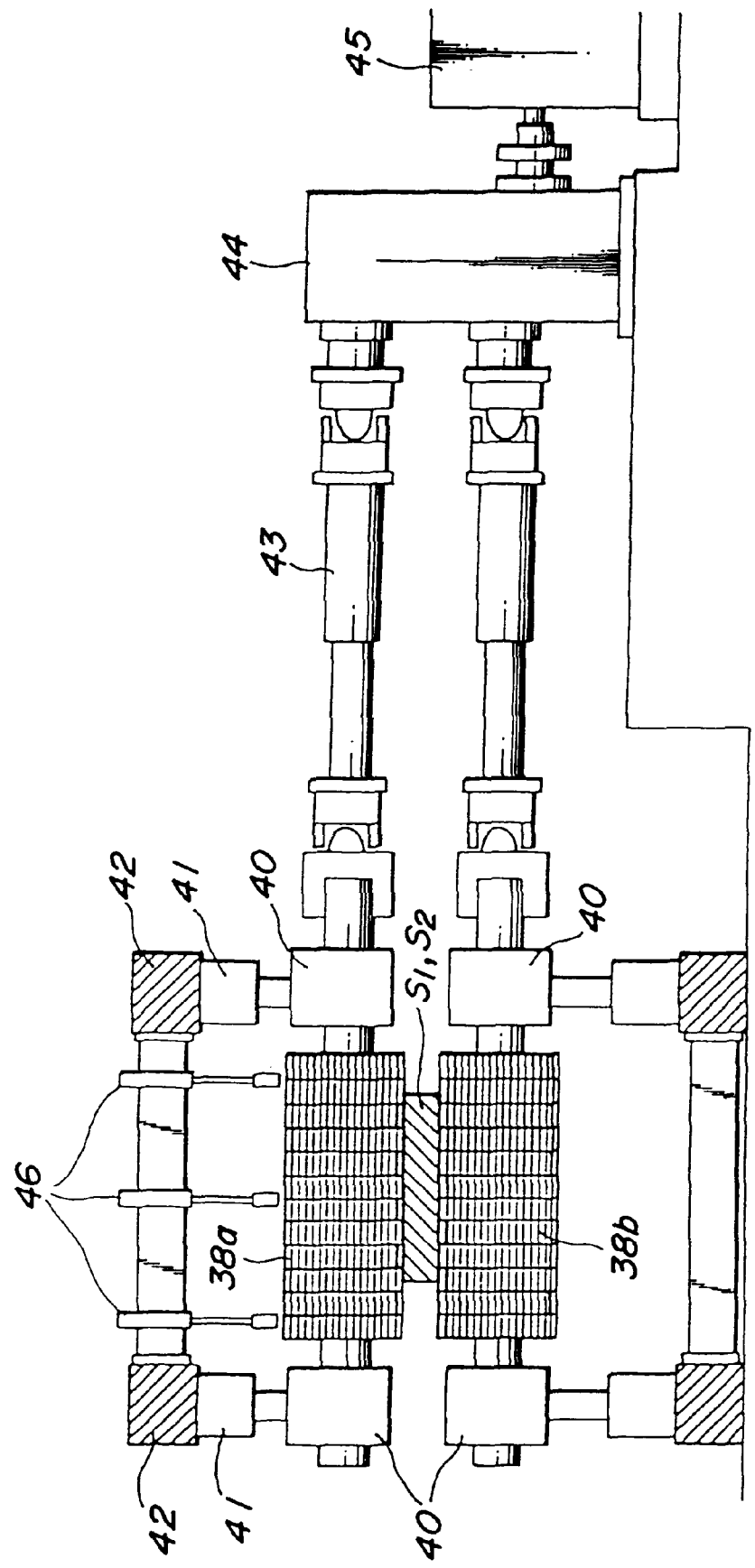

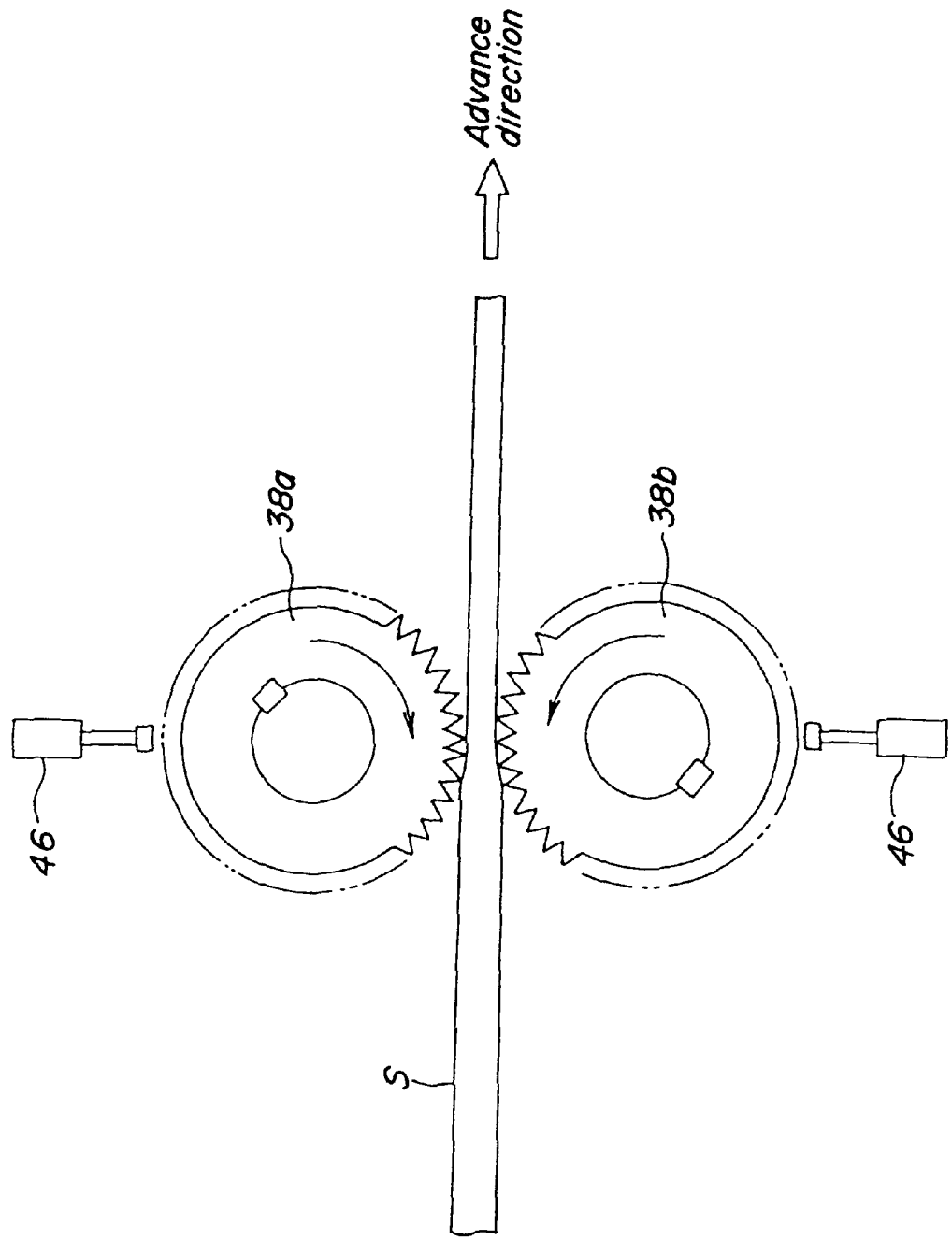

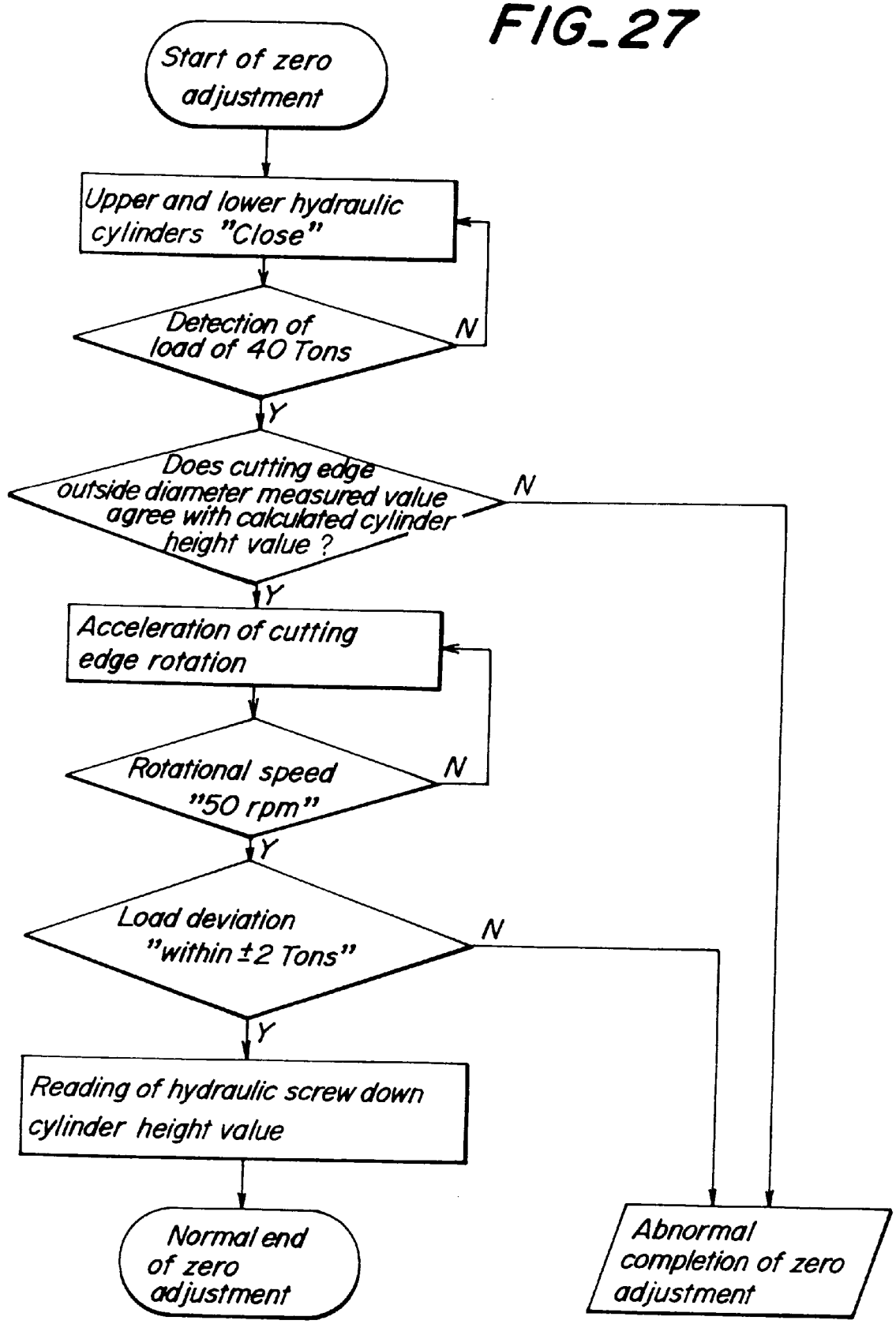
FIG_27

FIG_33

Cutting resistane reaction
(Rolling mill tension disturbance)

SURFACE CUTTING METHOD AND APPARATUS FOR HOT-ROLLED STEEL PRODUCTS

TECHNICAL FIELD

The present invention relates to a method and apparatus for surface cutting of hot-rolled steel products, especially wide hot-rolled long sheets, and a method and apparatus for surface cutting which are advantageous in removing raised portions (projections) and burrs produced in a joint region by butt joint of semifinished steel products such as sheet bars, slabs, billets, and blooms.

BACKGROUND ART

Regarding the technologies for making a repair of flaws produced on the surface of hot-rolled steel products such as sheet bars during the hot rolling process and for removing projections inevitably produced in the joint portion in the continuous hot rolling process in which rolling is carried out by butt joining the tail edge of preceding steel product to the leading edge of following steel product, many proposals have already been made in Unexamined Japanese Patent Publication No. 57-137008, Unexamined Japanese Patent Publication No. 63-160707, Unexamined Japanese Patent Publication No. 5-23706, Unexamined Japanese Patent Publication No. 5-104261, Unexamined Japanese Patent Publication No. 57-91856, Unexamined Japanese Patent Publication No. 53-112593, and so forth.

However, these technologies have disadvantages that there arises a trouble of breaking of a hot-rolled steel product (hereinafter referred simply as to a steel product) in surface-cutting the steel product, and that the improvement in cutting efficiency cannot be achieved because the life of cutting edge is short and quick action cannot be taken when local wear of cutting edge occurs. Also, there remain problems in that it is difficult to adjust a predetermined allowance in cutting a steel product, that the equipment is damaged by the contact of cutting edges which cut a steel product from upside and downside, that chips produced by cutting cannot be disposed well, and that fluttering of steel product occurs during the cutting process.

An object of the present invention is to provide a method and apparatus which can solve all above-described conventional problems occurring in surface cutting of steel products.

SUMMARY OF THE INVENTION

The present invention provides a surface cutting method for steel products in which in cutting the top and bottom surfaces of a steel product by the rotation of milling cutters holding the steel product therebetween in the thickness direction in the conveying process of the steel product having a joint portion, the cutting resistance is determined by the cutting conditions including the type of steel product, the temperature in cutting, and the cut depth is controlled by the adjustment of cut depth, and cutting is performed by making the tension produced on the steel product by the cutting resistance lower than the breaking strength of the joint portion to prevent the breakage of steel product.

2) In the above item 1), a sudden temperature rise of steel product is detected on the input side of milling cutter, the steel product is held between the milling cutter based on the detected signal, and the surfaces of the joint portion including the nearby portion of steel product are cut.

In the above, when the steel product running direction and the milling cutter rotating direction on the cut surface are reverse to each other, the adjustment of one-side cut depth t satisfies the following equation (1).

$$t \leq \sigma_b \cdot (b-2w) \cdot T / \{2S_f C \cdot exp\,[A/(T_k+273)] \cdot b \cdot V_M/V_c + 2\sigma_b!(b-2w)\} \quad (1)$$

where
- t: one-side cut depth (mm)
- $S_f$: safety factor
- $\sigma_b$: strength of joint portion of steel product considering temperature (kgf/mm$^2$)
- b: width of steel product (mm)
- w: one-side unjoined length in the sheet width direction at joint portion of steel product (mm)
- T: thickness of steel product (mm)
- C: constant determined by the type of steel product (kgf/mm$^2$)
- A: constant determined by the type of steel product (°C.)
- $T_k$: temperature of steel product in cutting (°C.)
- $V_M$: running speed of steel product (mm/s)
- $V_C$: circumferential speed of milling cutter cutting edge (mm/s)

In the above, when the steel product running direction and the milling cutter rotating direction on the cut surface are equal to each other, the adjustment of one-side cut depth t satisfies the following equation (2).

$$t \leq \sigma_b \cdot (b-2w) \cdot T / \{2S_f C \cdot exp\,[A/(T_k+273)] \cdot b \cdot V_M/V_c\} \quad (2)$$

where
- t: one-side cut depth (mm)
- $S_f$: safety factor
- $\sigma_b$: strength of joint portion of steel product considering temperature (kgf/mm$^2$)
- b: width of steel product (mm)
- w: one-side unjoined length in the sheet width direction at joint portion of steel product (mm)
- T: thickness of steel product (mm)
- C: constant determined by the type of steel product (kgf/mm$^2$)
- A: constant determined by the type of steel product (°C.)
- $T_k$: temperature of steel product in cutting (°C.)
- $V_M$: ruing speed of steel product (mm/s)
- $V_c$: circumferential speed of milling cutter cutting edge (mm/s)

In the above, at least the cutting edges of a milling cutter are made of a ferrous material, and cooling water is sprayed to the cutting face or flank of the milling cutter at a pressure according to the rotating speed and outside diameter.

Also, the present invention provides a surface cutting apparatus for steel products comprising a pair of main shafts which hold a steel product therebetween in the thickness direction and rotate in the direction reverse to each other, and having rotary drums each of which is provided on the main shaft and on which a plurality of disks each of which has cutting edges at the whole outer periphery and fits detachably to the main shaft are arranged (claim 6).

In the above, the disks are so arranged that the phase of cutting edges on the adjacent disks is shifted in the circumferential direction, and the cutting edges are arranged discontinuously in the axial direction (claim 7).

In the above, the main shaft is configured so that the disks are fixed to the main shaft by the expansion of shaft diameter.

In the above, the main shaft is configured so that the disks are fixed to the main shaft by the expansion of shaft diameter, and has a contracting mechanism for contracting the shaft diameter instantly when an excessive load is applied to the disks.

The present invention provides a surface cutting apparatus for steel products for cutting the top and bottom surfaces of a steel product continuously or intermittently by passing the steel product between a pair of rotary drums rotating in the direction reverse to each other, the apparatus having a disk for recognizing gap between drums, which has a diameter larger than that of the rotary drum, at both ends or one end of at least one rotary drum.

In the above, at least one rotary drum is provided with measuring means for measuring wear amount at the tip end of rotary drum to make level adjustment of rotary drum-with respect to the steel product.

The present invention provides a surface cutting apparatus for steel products for cutting the top and bottom surfaces of a steel product continuously or intermittently by passing the steel product between a pair of rotary drums rotating in the direction reverse to each other, the apparatus having chip discharge means for discharging chips, which are produced by the cutting of steel product by using the rotary drums, for each rotary drum.

In the above, flowing water injecting means is provided in the chip discharge means for the rotary drum.

The present invention provides a surface cutting apparatus for steel products for cutting the top and bottom surfaces of a steel product continuously or intermittently by passing the steel product between a pair of rotary drums rotating in the direction reverse to each other, the apparatus having a movable sheet passing guide for holding the steel product during the period of time when the steel product advances from the input side to the output side of the rotary drum pair (claim 14).

The present invention provides a surface cutting apparatus for steel products for cutting the top and bottom surfaces of a steel product continuously or intermittently by passing the steel product between a pair of rotary drums rotating in the direction reverse to each other, the apparatus having a holding roll or pinch roll for restraining a tension variation caused by the fluttering in surface cutting of the steel product on at least one of the input and output sides of the rotary drum.

BRIEF DESCRIPTION OF THE DRAWINGS

FIG. 7 is a view showing a overall configuration of cutting apparatus;

FIG. 8 is a view showing a construction of rotary drum of the conventional construction;

FIG. 9 is a view showing another construction of rotary drum of the conventional construction;

FIG. 19 is a diagram showing a positional change of rotary drum with time;

FIG. 20 is a view showing a surface cutting state of a steel product;

FIG. 22 is a view showing a configuration of the apparatus in accordance with the present invention, which can prevent the breakage of cutting edge and can recognize the gap between drums;

FIG. 24 is a view showing still another configuration of the apparatus in accordance with the present invention, which can measure the wear amount of cutting edge;

FIG. 25 is a view showing an example in which measuring means are disposed on the upside and downside of rotary drum;

FIG. 27 is a chart showing a specific procedure carried out when zero adjustment is made;

DETAILED DESCRIPTION OF PREFERRED EMBODIMENTS OF THE INVENTION

In hot rolling, when rolling is performed continuously by joining the tail edge of a preceding sheet to the leading edge of a following sheet between the rough rolling and the finish rolling to achieve a high efficiency, a method for finishing the sheet surface, in which the raised portion including the front and rear regions thereof is surface-cut by milling, has been used practically. At present, however, the cut depth in milling is the same for all objects, and special consideration is not given. Therefore, when the cutting resistance is varied greatly by the type, temperature, etc. of sheet, a trouble such that the sheet is broken at the joint portion having a low breaking strength occurs. As the technology for removing the raised portions (projections) at the sheet joint portion, a method has been proposed in which the weld is detected by a detector, a cutting apparatus is activated by the detection signal, and weld burrs are removed while the sheet is running, as in Unexamined Japanese Patent Publication No. 53-112593 (Method for Removing Weld Burrs of Sheet). Also, a method has been proposed in which the projections at the joint portion are cut by cutting edges of a surface treatment apparatus provided before a hot rolling mill, as in Unexamined Japanese Patent Publication No. 63-160707 (Hot Rolling Equipment). However, it is very difficult to overcome the trouble of breakage of joint portion by these methods.

The present invention solves the above problem. Specifically, the cutting resistance defined by the cutting conditions (type of steel (chemical composition), temperature, sheet width, sheet thickness, running speed, rotating direction of milling cutter, circumferential speed of cutting edge, cut depth, etc.) for the milling cutter is controlled by the adjustment of cut depth, and the tension produced on the steel product by the cutting resistance is decreased to a value lower than the breaking strength of the joint portion to prevent the breakage of the steel product. The following is a specific description of this point for the case of sheet as an example.

Figure 1:
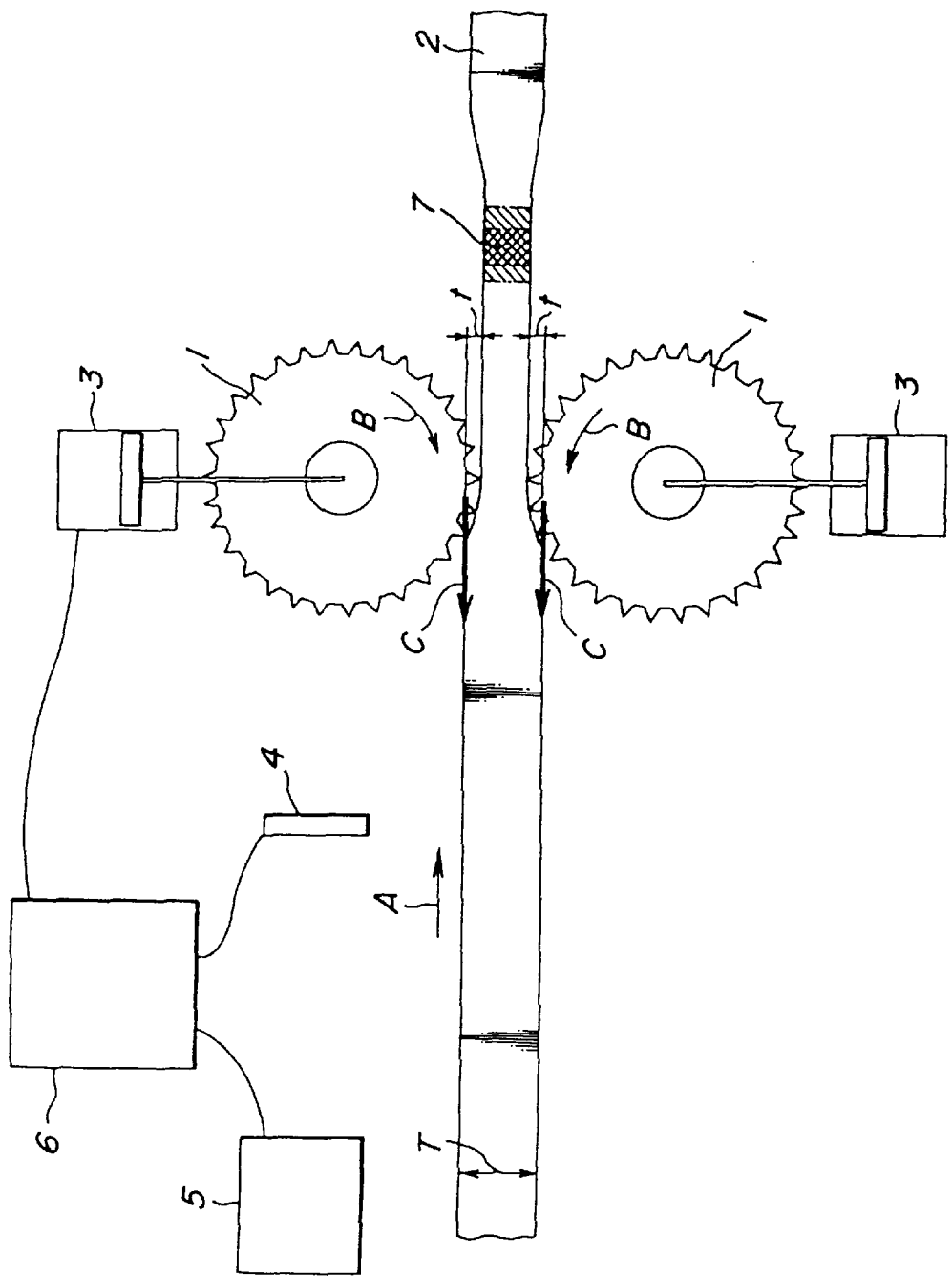
FIG. 1 is a side view showing a state of surface cutting of a steel product.
Figure 2:
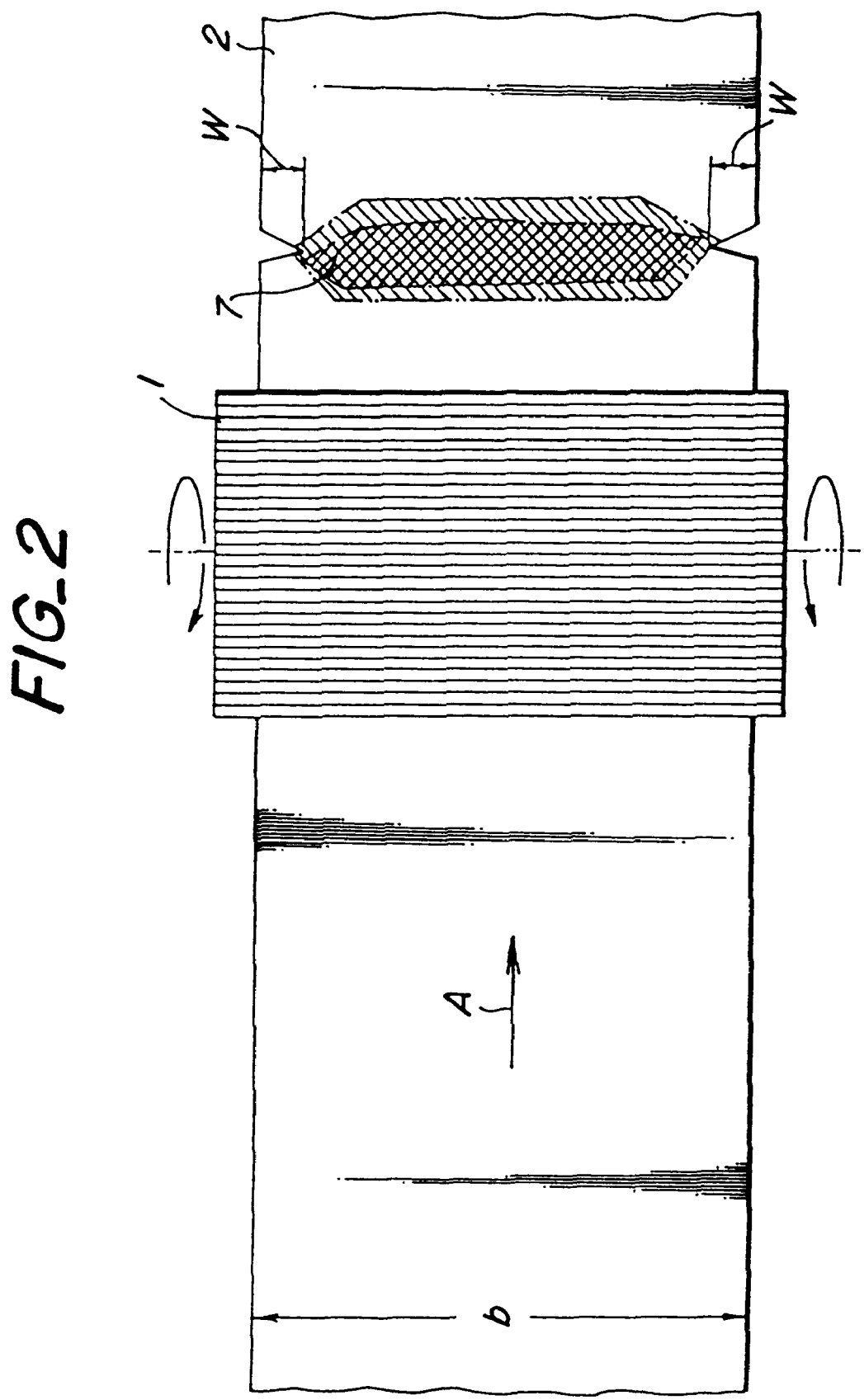
FIG. 2 is a plan view of FIG. 1.

FIGS. 1 and 2 are a side view and a plan view, respectively, showing a state in which the surface of a running sheet is cut by milling cutters.

In FIGS. 1 and 2, reference numeral 1 denotes a milling cutter having cutting edges at the tip end thereof, 2 denotes a sheet, 3 denotes a position control cylinder for milling cutter, 4 denotes a thermometer, 5 denotes a process computer, 6 denotes a control panel, and 7 denotes a joint portion of sheet 2. Arrow A indicates the running direction of sheet 2, arrow B indicates the rotating direction of milling cutter 1, and arrow C indicates the direction of tension caused on the sheet 2 by the cutting resistance. Reference character b denotes the width of sheet 2, T denotes the thickness of sheet 2, t denotes the cut depth on one side produced by milling cutter 1, and w denotes the unjoined length at the edge in the sheet width direction at the joint portion 7.

Figure 3:
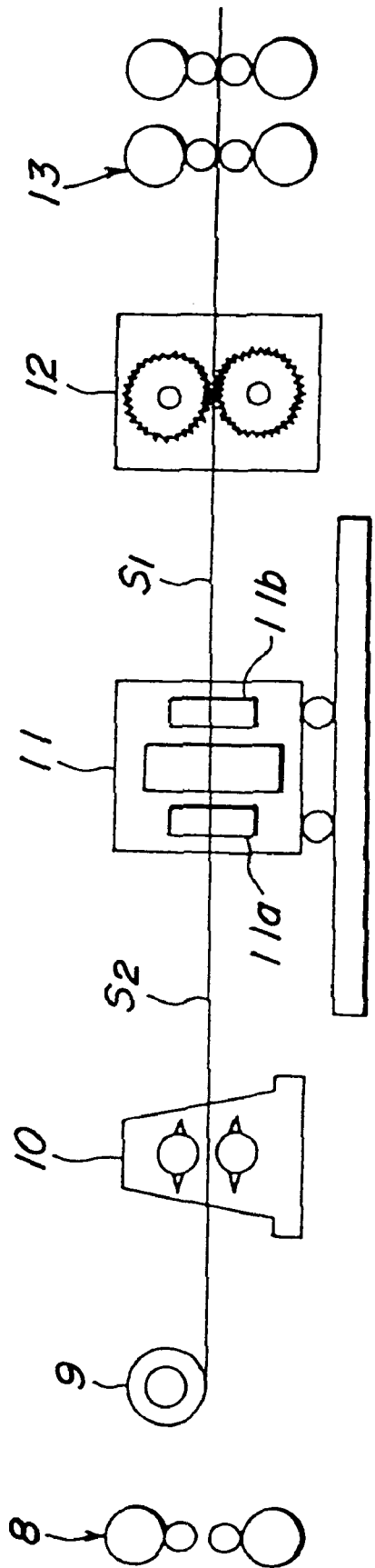
FIG. 3 is a schematic view of a continuous hot rolling facility.

FIG. 3 is a view showing a typical arrangement of a cutting apparatus having the milling cutters in accordance with the present invention.

In FIG. 3, the sheet (sheet bar) rolled by, for example, a rough rolling mill 8 is wound by a winding/rewinding device 9, the edge of respective sheets $S_1$ and $S_2$ is cut into a predetermined shape by a cutting device 10 (drum shear etc.) on the input side of a scale breaker (not shown) and a hot finish rolling mill 13 ($F_1$, $F_2$, $F_3$, . . . ) while the sheet is rewound by the winding/rewinding device 9, the tail edge of the preceding sheet $S_1$ and the leading edge of the following sheet $S_2$ are arranged in an opposed relation with a small gap being provided therebetween, and then the nearby region is held in the sheet thickness direction by clamps 11a and 11b mounted on a movable joining device 11. In this state, the sheets are joined by pressing by means of a pressing means (the clamps 11a and 11b can be moved so as to be closer to each other) while being induction heated by, for example, an inductor for induction heating located at at least one position of just above and just below the portion to be joined or after being induction heated. After the raised portions caused by this joining operation including the front and rear regions thereof are surface-finished by a milling device 12, the rolling is performed.

In the case where surface cutting is performed between the rough rolling mill 8 and the finish rolling mill 13, the tension produced on the sheet by cutting resistance acts between the milling cutter 1 and the downstream-side finish rolling mill 13 when the rotating direction of the milling cutter 1 is the direction as shown in FIGS. 1 and 2 (up cut), and the tension acts between the milling cutter 1 and the upstream-side coil winding/rewinding device 9 when the rotating direction of the milling cutter is reverse to the above (down cut).

The sheets are joined usually by the induction heating process, in which unjoined portions are formed in the sheet width direction at present for various reasons caused by the fact that heating is not uniform in the sheet width direction. Therefore, the joint portion 7 has a lower breaking strength than the base metal because the joint portion is hotter than the base metal due to heating in joining (base metal: about 900° C., joint portion: about 1300° C.) and the joint portion has the unjoined portions.

According to the present invention, in FIGS. 1 and 2, the information about the data on sheet 2. (steel type, sheet width b, sheet thickness T) is given to the control panel 6 by the process computer 5 to which these data are inputted, a temperature signal of the running sheets ($S_1$, $S_2$) is sent from the thermometer 4 installed on the apparatus input side to the control panel 6, and the cut depth t on one side is determined at the control panel 6 based on the signal. The milling cutter position control cylinders 3 are activated by the signal from the control panel 6, and cutting of the cut depth t determined as described above is performed by using milling cutters 1.

When the joint portion 7 including the front and rear regions thereof is surface-cut, the joint portion 7 is detected by sudden rise in temperature on the thermometer 4, and the milling cutter position control cylinders 3 are activated through the control panel 6 based on the temperature signal, by which the surface cutting of that portion can be performed reliably. At this time, it is important to appropriately determine the distance between the thermometer 4 and the milling cutter 1 by considering time lag etc.

The surface cutting of the joint portion 7 including the front and rear regions thereof of the sheet 2 is important not only to the removal of projections at the joint portion 7 and the nearby regions thereof but also to the removal of misalignment produced in the sheet thickness direction at the joint portion, clamp flaws, new scale, etc. Accordingly, it is essential to cut to a depth such that these defects can be removed.

The procedure for deriving an experimental equation for determining the cut depth in the case of up cut as shown in FIG. 2 is as follows.

First, using the strength of joint portion 7: $\sigma_b$ (kgf/mm$^2$), unjoined length: w (mm), cut depth: t (mm), width of sheet 2: b (mm), and sheet thickness: T (mm), the breaking strength of the joint portion 7: $f_b$ (kgf) can be expressed as $$f_b = \sigma_b \cdot (b-2w) \cdot (T-2t) \quad (3)$$

where the above $f_b$ and $\sigma_b$ are values for which temperature is considered.

On the other hand, the relationship between the cut resistance for each steel type: k (kgf/mm$^2$) and the temperature of sheet during cutting: $T_k$(°C.) is given by experiment as $$k = C \, exp[A/(T_k+273)] \quad (4)$$

where C (kgf/mm$^2$) and A (°C.) are constants determined by the steel type of sheet 2. From Eq. (4), using the running speed of sheet 2: $V_M$ (mm/s) and the circumferential speed of milling cutter cutting edge: $V_C$ (mm/s), the cutting resistance: fa (kgf) is expressed as $$f_a = k \cdot b \cdot t \cdot V_M/V_C \quad (5)$$

Using Eqs. (3), (4), and (5) and considering safety factor: $S_f$ (2–5, it is especially important to consider the deterioration in breaking characteristics caused by notch effect of unjoined portion), the cut depth: t (mm) such that the joint portion 7 is not broken by cutting can be determined as follows:

$$2S_f f_a = f_b \quad (6)$$

Substitution of Eqs. (3), (4) and (5) in Eq. (6) yields $$2S_f C \cdot exp[A/(T_k+273)] \cdot b \cdot t \cdot V_M/V_C = \sigma_b \cdot (b-2w) \cdot (T-2t) \quad (7)$$

Therefore, $$t = \sigma_b(b-2w) \cdot T/\{2S_f C \cdot exp[A/(T_k+273)] \cdot b \cdot V_M/V_C + 2\sigma_b \cdot (b-2w)\} \quad (8)$$

can be derived.

In the case of down cut in which the rotating direction of milling cutter 1 is reverse to the direction shown in FIG. 2, since the tension acting on the sheet 2 by the cutting resistance fa is on the input side of the milling cutter 1, the effective sheet thickness is equal to sheet thickness: T (the projections at the joint portion 7 are ignored), so that the above-described equation (3) is expressed as $$f_b = \sigma_b \cdot (b-2w) \cdot T \quad (9)$$

Therefore, $$2S_f C \cdot exp[A/(T_k+273)] \cdot b \cdot t \cdot V_M/V_C = \sigma_b \cdot (b-2w) \cdot T \quad (10)$$

From this equation, $$t = \sigma_b \cdot (b-2w) \cdot T/\{2S_f C \cdot exp[A/(T_k+273)] \cdot b \cdot V_M/V_C\} \quad (11)$$

is derived.

In deriving the above equations for calculating the cut depth t, the raised portions at the joint portion 7 are ignored in both cases of up cut and down cut. This is because under the ordinary process conditions, although the joint portion 7 has a substantially great cut depth, the cutting resistance is low because of high temperature. This is apparent from the fact that breakage of the joint portion 7 does not occur at all in cutting the joint portion 7 (raised portions) in the actual process.

For the sheets of various steel type including extra low carbon steel and SUS304 stainless steel, the surface cutting was performed between the rough rolling and the finish rolling in the hot rolling, and the cut depth t was controlled so as to be a value smaller than the value calculated from Eq. (8) in the case of up cut and from Eq. (11) in the case of down cut. As a result, the breakage of the joint portion does not occur at all.

The following is a description of a case where the life of milling cutter used for surface cutting of sheets is prolonged and stable surface cutting is performed while preventing loading etc. by using the means described in the above item 5).

The surface finishing of slabs and hot-rolled plates is performed by using a grinder having a grindstone as disclosed in Unexamined Japanese Patent Publication No. 57-91856. Such a grinder has a low work efficiency when grinding a wide, long object such as a plate. Especially when the slab surface is finished by the grinder in direct rolling, a high energy loss is produced because the steel product being finished stays for a long period of time and the heat thereof dissipates in the air. On the other hand, a milling cutter type cutting edge having a drum length which covers the overall range in the plate width direction has been used as a means for improving the cutting efficiency. When a non-ferrous material such as ceramics and tungsten carbide is used for such a cutting edge, the life of cutting edge is greatly shortened by wear, causing the cost to climb. Alternately, when a ferrous cutting edge is used, the problem with the cutting edge of non-ferrous material such as ceramics and tungsten carbide is eliminated, but chips are liable to adhere to the cutting edge, so that the heat input from chips to cutting edge causes a melting loss, and also a stable operation cannot be performed for a long period of time because loading or clogging of cutting edge occurs easily.

In the present invention, therefore, when the surface cutting of sheet is performed using a ferrous milling cutter, cooling water is sprayed to the cutting face or flank of milling cutter at a pressure in accordance with the rotating speed and outside diameter, by which the life of the milling cutter used for the surface cutting of slabs and sheets such as hot-rolled sheets (hoops) is prolonged, and stable surface cutting to prevent loading can be achieved.

By spraying cooling water to the cutting face or flank of cutting edge at a hydraulic pressure in accordance with the rotating speed and outside diameter of the milling cutter, high-temperature chips adhering to the cutting edge by cutting can be removed instantly by the centrifugal force caused by the rotation of milling cutter and the pressure of water, so that the heat input from the deposits at the cutting edge is decreased greatly. Therefore, the life of milling cutter is increased remarkably and the loading of cutting edge caused by the deposits is eliminated.

The centrifugal force $F_W$ generated by the rotation of milling cutter is expressed as $$F_w = m(V^2/r) \quad (12)$$

where m: mass of chips

V: rotating speed of milling cutter r: ½ of outside diameter of milling cutter.

Also, the cooling water power $F_P$ is expressed as $$F_P = \frac{1}{2} \cdot qv^2 = a(P_1/P_2)^{3/2} \quad (13)$$

where q: mass of water v: colliding speed of water a: constant determined from the flow rate at reference pressure $P_1$ of water according to the nozzle model specification $P_2$: supply pressure of water Therefore, in order to remove the chips deposited in cutting by using a milling cutter, cooling water should be sprayed so that the pressure of cooling water satisfies the following equation.

$$(F_w + F_P)/A > \sigma_B \quad (14)$$

where

Figure 4:
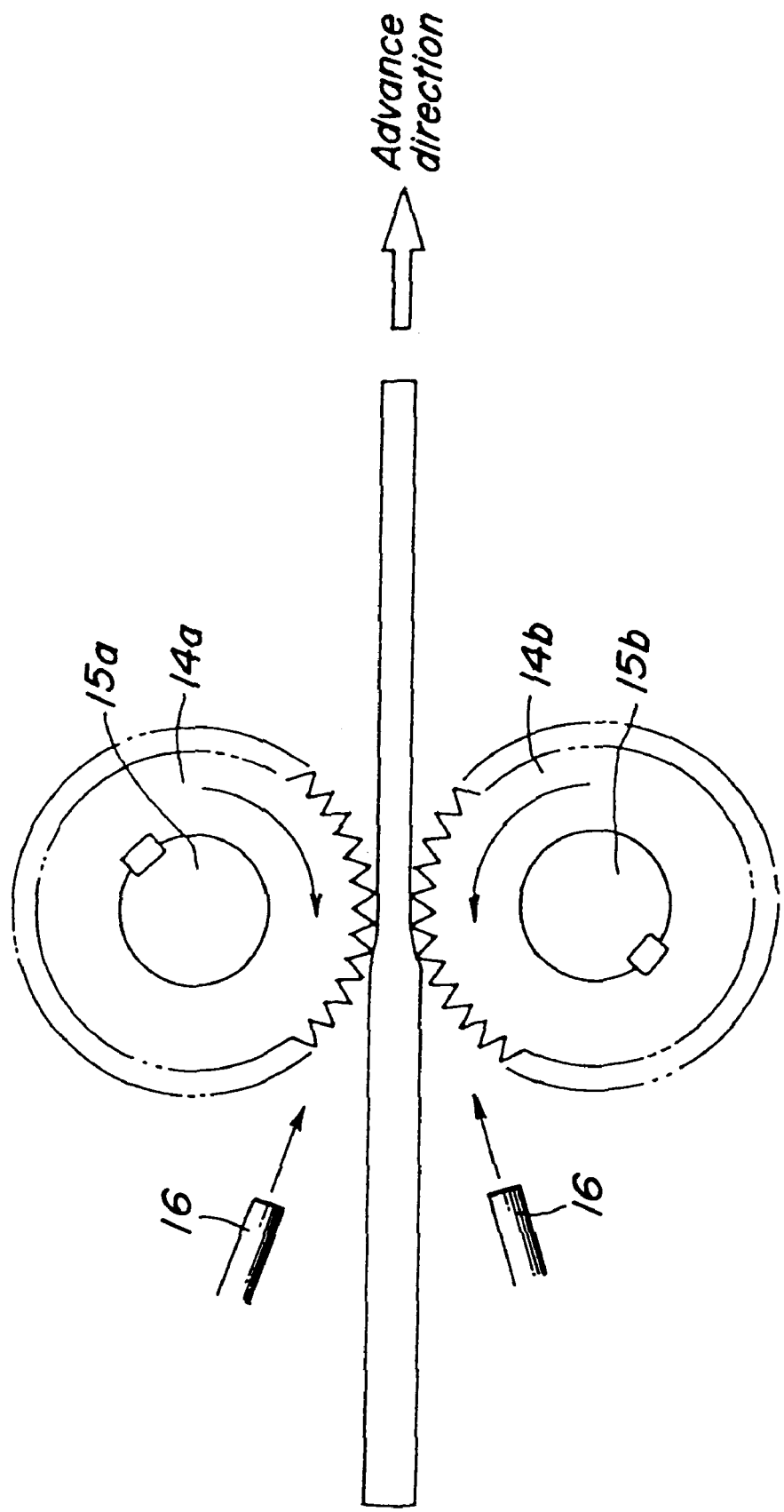
FIG. 4 is a view showing a state of cooling at the leading edge of cutting edge of a rotary drum.

A: cross sectional area of chip deposit $\sigma_B$: high-temperature tensile strength of sheet The following is a description of a case where the milling cutters 14a and 14b are rotated by the drive of the shafts 15a and 15b, respectively, and cooling water is sprayed from a nozzle 16 to the cutting face thereof as shown in FIG. 4.

Figure 5:
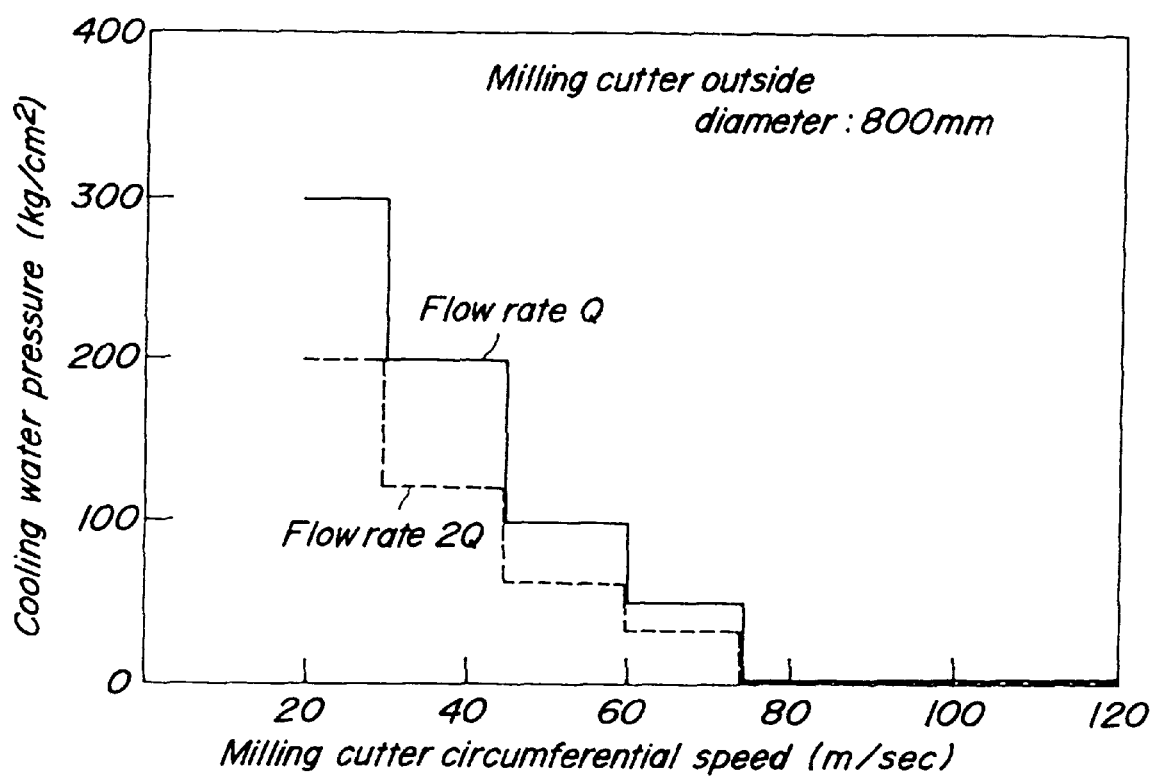
FIG. 5 is a diagram showing the relationship between the circumferential speed of milling cutter and the pressure of cooling water.

FIG. 5 shows the result of experiment in which the cooling water pressure such that the melting loss and loading of cutting edge do not occur is determined with the outside diameter of milling cutter being set at 800 mm and the circumferential speed thereof being varied in the range of 20 to 120 m/sec. In this figure, the solid line indicates the lower limit value of cooling water pressure when the flow rate is Q, and the broken line indicates the lower limit value of cooling water pressure when the flow rate is 2 Q.

From this, it is found that the centrifugal force $F_w$ increases with the increase in circumferential speed of milling cutter, so that the melting loss and loading of cutting edge do not occur even if the cooling water power $F_P$ is decreased by the decrease in cooling water pressure.

That is, it is preferable that the cooling water pressure decrease with the increase in the circumferential speed of milling cutter. Also, this figure indicates that the cooling water pressure should be adjusted in the range of 3 to 300 kgf/cm² for the circumferential speed of milling cutter in the range of 20 to 120 m/sec.

Figure 6:
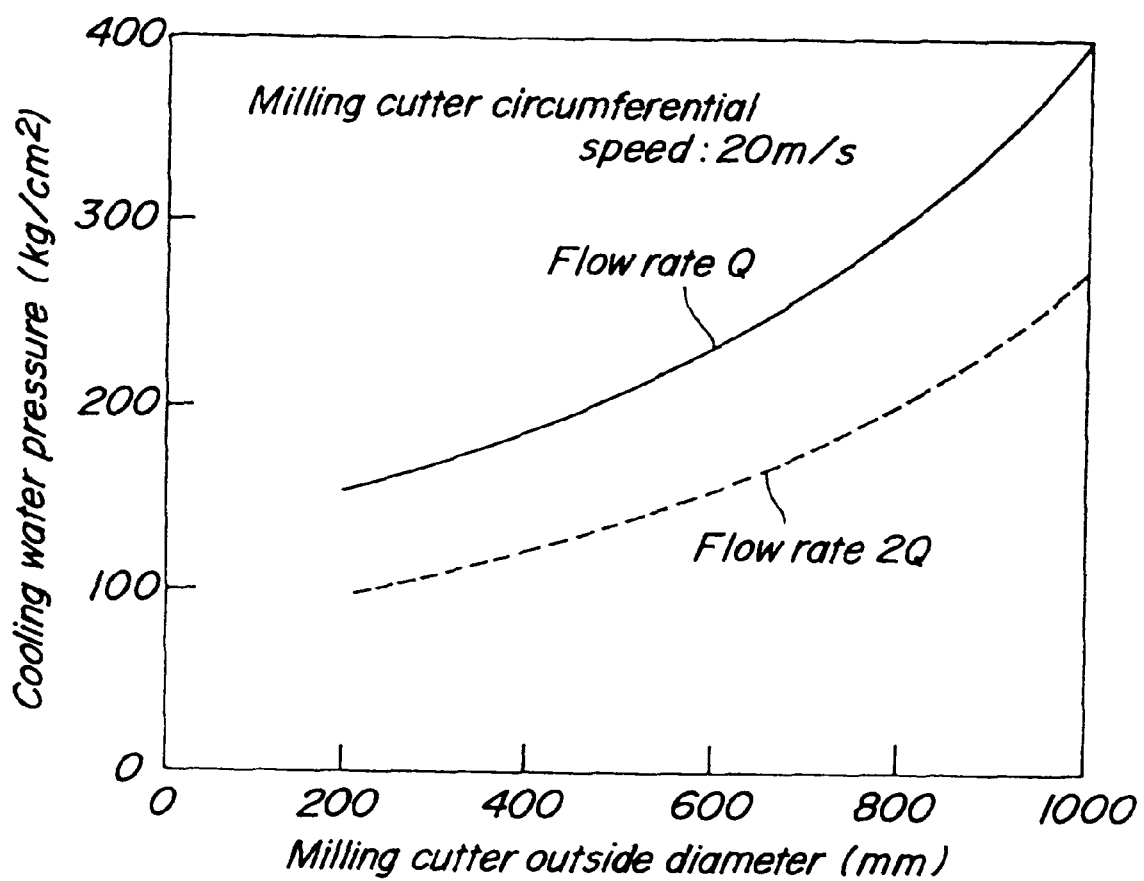
FIG. 6 is a diagram showing the relationship between the outside diameter of milling cutter and the pressure of cooling water.

FIG. 6 shows the result of experiment in which the cooling water pressure such that the melting loss and loading of cutting edge do not occur is determined with the circumferential speed of milling cutter being fixed at 20 m/sec and the outside diameter thereof being varied in the range of 200 to 1000 mm. In this figure, the solid line indicates the lower limit value of cooling water pressure when the flow rate is Q, and the broken line indicates the lower limit value of cooling water pressure when the flow rate is 2 Q.

From this, it is found that since the centrifugal force $F_W$ decreases in inverse proportion as the outside diameter of milling cutter increases, the melting loss and loading of cutting edge is not produced by the increase in cooling water pressure as the power of three by two (the increase in cooling water power $F_P$).

That is, it is preferable that the cooling water pressure increase with the increase in the diameter of milling cutter. This indicates that cooling water according to the rotating speed and outside diameter of milling cutter should be sprayed to the cutting face of milling cutter.

On the other hand, it is found from FIGS. 5 and 6 that when the quantity of cooling water is doubled, the cooling water pressure such that the melting loss and loading of cutting edge do not occur decreases. This is probably because the quantity of water colliding with the cutting edge per unit time is increased by the increase in flow rate.

The rotating speed of milling cutter should preferably be 20 to 120 m/sec. The reason for this is that if the rotating speed of milling cutter is lower than 20 m/sec, the speed is decreased and the milling cutter is stopped by the cutting resistance, while if the rotating speed of milling cutter is higher than 120 m/sec, the vibration frequency due to the number of revolutions becomes equal to or higher than the critical speed, so that the machine resonates, sometimes being destroyed.

The outside diameter of milling cutter should preferably be 600 to 1000 mm. The reason for this is that if the outside diameter is smaller than 600 mm, the number of revolutions for achieving the circumferential speed increases, so that the vibration frequency exceeds the critical speed, or the drop in speed due to cutting resistance is great, so that the milling cutter is stopped, while if the outside diameter is larger than 1000 mm, though the large outside diameter is advantageous in terms of vibration because of the decrease in the number of revolutions, the centrifugal force decreases, so that the melting loss and loading of cutter edge are liable to occur, and the motor output for driving increases.

In the above explanation, the case where cooling water is sprayed to the cutting face of cutting edge has been described. The case where cooling water is sprayed to the flank of milling cutter is the same, so that the explanation thereof is omitted.

FIG. 4, which has been mentioned before, shows a case where surface cutting of steel product is performed using ferrous milling cutter by spraying cooling water to the cutting face of milling cutter. In this figure, reference numerals 14a and 14b denote milling cutters, 15a and 15b denote main shafts, 16 denotes a spray nozzle for cooling water, 17 denotes a bearing for rotatably supporting the milling cutter 14a, 14b, 18 denotes a screw down cylinder, 19 denotes a housing, 20 denotes a power transmission spindle, 21 denotes a pinion stand, and 22 dentes an electric motor. FIG. 7 shows the overall configuration of a facility in which the milling cutter is incorporated.

Investigation was made on the state of melting loss and loading of cutting edge for the case where surface cutting of a slab of 120 mm thick and 800 mm wide was performed by rotating a ferrous milling cutter with a diameter of 800 mm at a speed of 65 m/s and by spraying cooling water with a flow rate of 500 l/min/m and a pressure of 50 kgf/cm$^2$ to the cutting face, and for the conventional method in which the circumferential speed of milling cutter was 20 m/sec and the pressure of cooling water was 3 kgf/cm$^2$ (other conditions were the same as those of the present invention). The result was that the melting loss and loading of cutting edge did not occur at all for about 72 hours in the method in accordance with the present invention, though the life of milling cutter was about 30 minutes in the conventional method, and it was confirmed that the life of milling cutter can be prolonged to about 30 days.

The example in which cooling water was sprayed to the cutting face of milling cutter is as follows: By using a slab with the same size as that described above, investigation was made on the state of melting loss and loading of cutting edge for the case where surface cutting of was performed by rotating a ferrous milling cutter with a diameter of 800 mm at a speed of 65 m/sec and by spraying cooling water with a flow rate of 500 l/min/m and a pressure of 50 kgf/cm to the cutting face, the case being in accordance with the present invention, and for the conventional method in which surface cutting was performed by rotating a milling cutter with the same diameter at a speed of 20 m/sec by spraying cooling water with a flow rate of 500 l/min/m and a pressure of 3 kgf/cm$^2$ (other conditions were the same as those of the present invention). The result was that the life of milling cutter could be prolonged to about 30 days in this case as well.

In this example, investigation was made for the case where the tail edge of preceding sheet and the leading edge of following sheet were butt joined and the resultant projections were cut. In this case as well, it was confirmed that the life of milling cutter can be prolonged remarkably as compared with the conventional method.

The following is a description of a case where the repair or replacement of milling cutter is easily made when the life of milling cutter, which is used for the surface cutting of sheet by using the means described in the above items 6) to 9), has been expired.

Regarding the technologies for making a repair of flaws produced on the surface of sheets during the hot rolling process and for removing projections inevitably produced in the joint region in the continuous hot rolling process in which rolling is carried out by butt joining the tail edge of preceding steel product to the leading edge of following steel product, as described before, many proposals have already been made in Unexamined Japanese Patent Publication No. 57-137008, Unexamined Japanese Patent Publication No. 63-160707, Unexamined Japanese Patent Publication No. 5-23706, Unexamined Japanese Patent Publication No. 5-104261, and so forth. Usually, cutting is performed by using a rotary drum of milling cutter type which is about 100 mm wider than the object to be cut. Such a drum is generally a drum which is integral with a main shaft portion whose both ends are supported via bearings as shown in FIG. 8 (centrifugal casting etc.), or a drum which is mounted to a main shaft via a key as shown in FIG. 9.

For the rotary drum of such a construction, especially the rotary drum integral with the main shaft, even when a partial repair of cutting edge only (for example, work of reinstalling cutting edge on the roll drum) is made, troublesome work of removing the rotary drum together with the main shaft is needed, so that it is difficult to improve the efficiency of work including the assembling work.

For the rotary drum which is mounted to the main shaft via a key, since the main shaft and the drum are separate, the mounting and dismounting of rotary drum are easy as compared with the integral type. However, since the rotary drum rotates together with the main shaft, it is necessary to strictly set the fitting tolerance to decrease the runout of rotary drum in the rotation of main shaft. For this reason, it is difficult to mount the rotary drum to the main shaft. When the rotary drum is deformed or when seizure occurs between the rotary drum and the main shaft, the rotary drum must be replaced together with the main shaft, so that the problem still remains.

In the present invention, therefore, as a cutting device, a configuration is used in which a plurality of disks, each of which has cutting edges at the whole outer periphery and detachably fits to a main shaft, are arranged on a pair of main shafts which hold a sheet therebetween in the sheet thickness direction and rotate in the direction reverse to each other. For the disks, the phase of cutting edges on the adjacent disks is shifted in the circumferential direction, and the cutting edges are arranged discontinuously in the axial direction. Also, the disks are fixed by expanding the main shaft diameter. Further, the main shaft has a contracting mechanism for instantly contracting the shaft diameter if an overload is applied to the disk. These features are especially advantageous in the present invention.

A plurality of disks having cutting edges at the whole outer periphery are arranged along the axis of the main shaft (the number of disks covers the entire range of object to be cut), and these disks are bound to configure a rotary drum. Thereupon, the mounting and dismounting of rotary drum can be performed very easily, and when the life of cutting edges has locally been expired, only the corresponding disks can be replaced.

By shifting the phase of cutting edges on the adjacent disks in the circumferential direction and by arranging the cutting edges discontinuously in the axial direction, the length of chip produced in cutting the sheet surface can be decreased, so that there is no risk of damaging the cutting edge by entanglement of chips around the cutting edge, and also the chips can be removed relatively easily. Even about 1 to 2 mm of shift of cutting edges on the adjacent disks can be expected to achieve sufficient effect, but the cutting edges can be shifted to about ½ of cutting edge pitch (the distance between cutting edges disposed at the outer periphery of disk).

The disks are fixed to the main shaft by the expansion of main shaft, and removed from the main shaft by the contraction of main shaft, so that the tolerance of fitting to the main shaft need not be set so strictly as before.

The expansion and contraction of main shaft can be performed, for example, by making the interior of main shaft hollow, and by pouring or discharging hydraulic oil into or from the interior to regulate the pressure in the main shaft. If an excessive load is applied to the cutting edge during the sheet cutting process, the damage to cutting edge cannot be avoided. Therefore, it is especially effective to provide a contracting mechanism in which, for example, a striker is provided on the side of a disk fixing flange, a plug is provided on the main shaft close to the striker, and the plug is allowed to be dropped from the main shaft by the striker to decrease the pressure in the main shaft when a force of some amount is applied to the cutting edge and the disk tries to rotate around the main shaft, by which the shaft diameter is instantly contracted.

Figure 10:
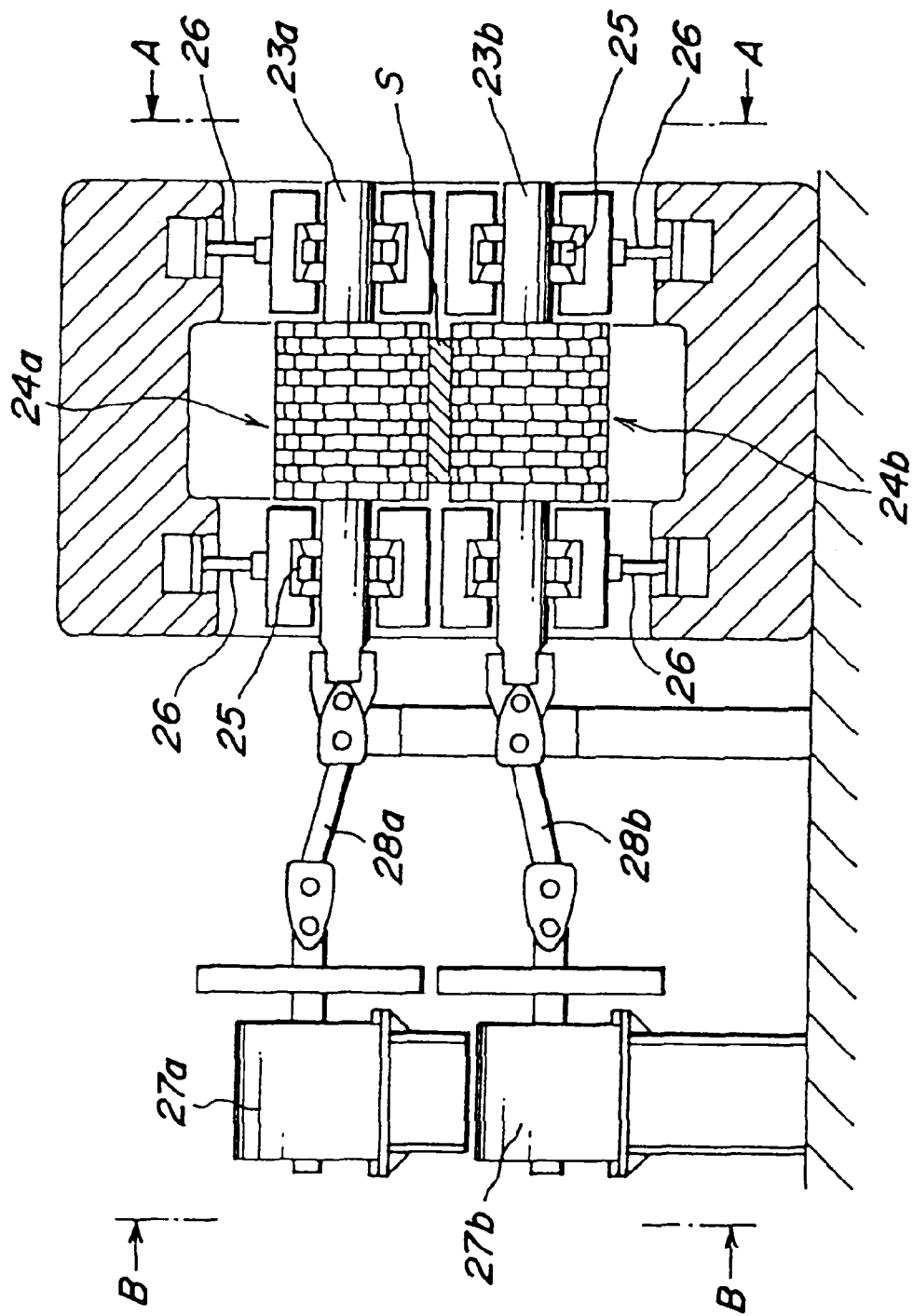
FIG. 10 is a view for illustrating the configuration of a cutting apparatus in accordance with the present invention.
Figure 11:
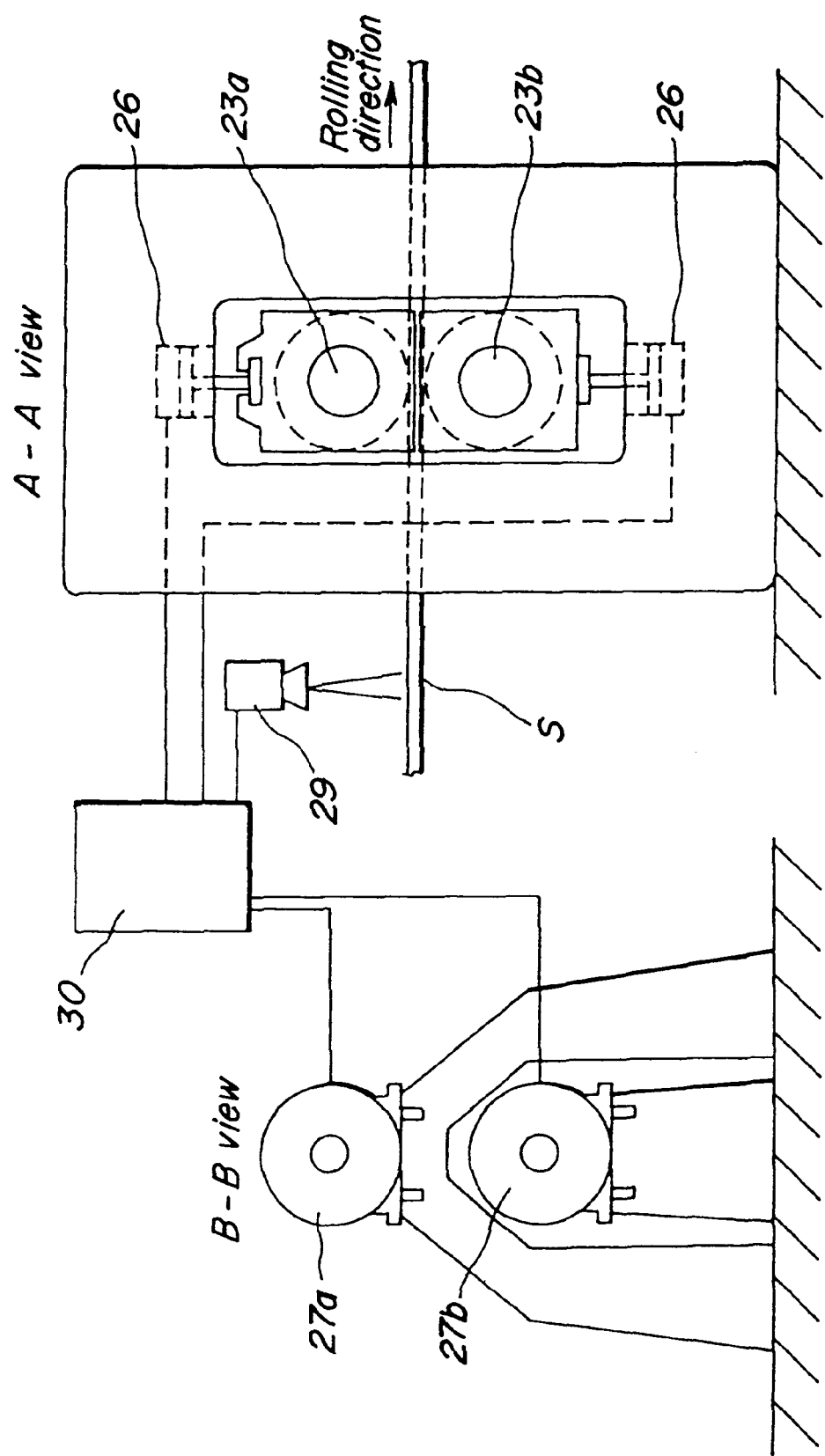
FIG. 11 is views taken along the lines A—A and B—B of FIG. 10.

FIGS. 10 and 11 show a sheet surface cutting apparatus in accordance with the present invention. In these figures, reference character S denotes a sheet, 23a and 23b denote main shafts which hold the sheet S therebetween in the sheet thickness direction and rotate in the direction reverse to each other, and 24a and 24b denote rotary drums. The rotary drum 24 consists of a plurality of disks $i_1 \ldots i_i$ each of which has cutting edges at the whole outer periphery thereof and fits detachably to the main shaft 23a, 23b. These disks $i_1 \ldots i_i$ are fixed and held by flanges etc.

Reference numeral 25 denotes a bearing for rotatably holding the main shaft 23a, 23b, and 26 denotes a liquid-operated cylinder for moving the main shaft 23a, 23b together with the bearing 25. By operating the liquid-operated cylinders 26, the gap between the rotary drums 24a and 24b is adjusted.

Reference numerals 27a and 27b denote driving motors, 28a and 28b denote universal joints for connecting the driving motor 27a, 27b to the main shaft 23a, 23b, 29 denotes a joint portion position detector, and 30 denotes a controller for controlling the rotational speed of the driving motor 27a, 27b, and operating the liquid-operated cylinders 26 based on the measurement result of the joint portion position detector 29.

Figure 12:
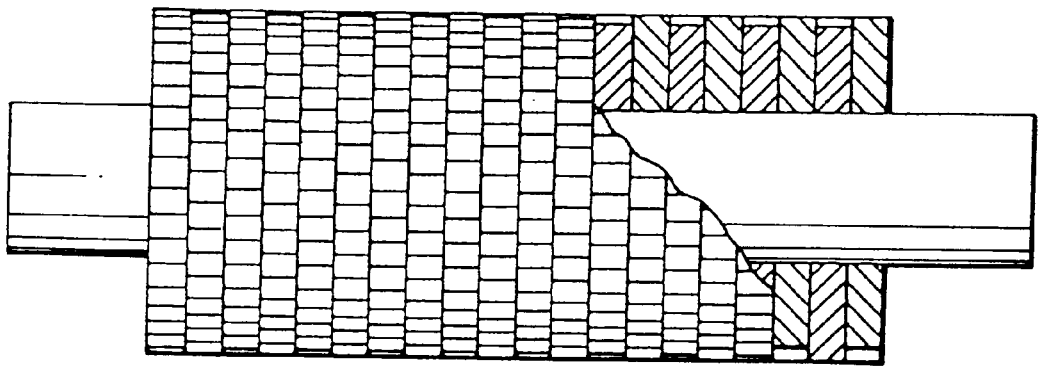
FIG. 12 is a view showing only a rotary drum for the apparatus in accordance with the present invention.

FIG. 12 shows the rotary drum 24a, 24b only. As shown in this figure, in the present invention, the rotary drum 24a, 24b is so configured that a plurality of disks $i_1 \ldots i_i$ are arranged on the main shaft 23a, 23b, so that the mounting and dismounting of rotary drum can be performed easily.

Figure 13:
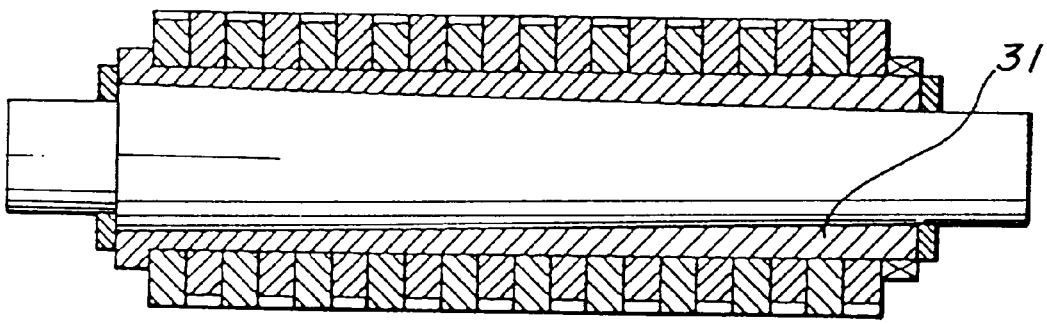
FIG. 13 is a view showing only another rotary drum for the apparatus in accordance with the present invention.

As shown in FIG. 13, the main shaft 23a, 23b is tapered, and the disks $i_1 \ldots i_i$ are mounted on a sleeve 31 fitting to this taper and bound and fixed firmly by the flanges and lock nuts etc., by which the looseness between the disk and main shaft as well as the looseness between disks can be eliminated, and moreover the mounting and dismounting of disk can be performed more easily.

Figure 14:
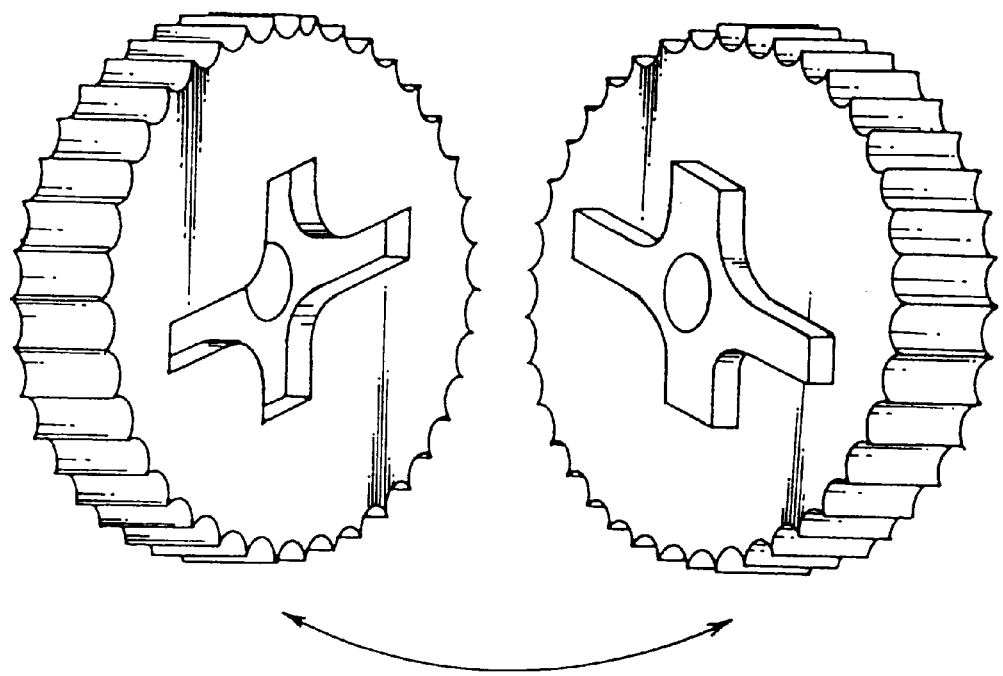
FIG. 14 is a view showing a fixing construction of disks.

The looseness between the adjacent disks in cutting can be prevented, for example, by providing a convex and concave on the adjacent faces of disks in advance as shown in FIG. 14, and by fitting the convex to the concave.

Figure 15:
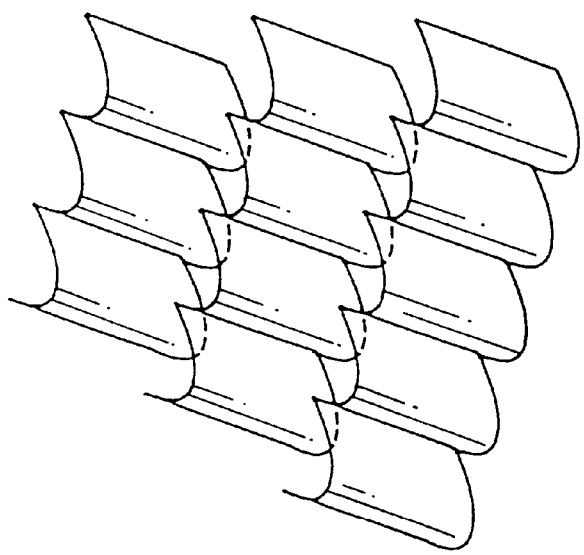
FIG. 15 is a view showing the principal portion of cutting edge.

In configuring the rotary drum 24a, 24b, the phase of cutting edges on the adjacent disks is shifted in the circumferential direction and the cutting edges are arranged discontinuously in the axial direction as shown in FIG. 15, by which the length of chip can be decreased, so that the damage to cutting edge caused by the entanglement of chips can be avoided.

Figure 16:
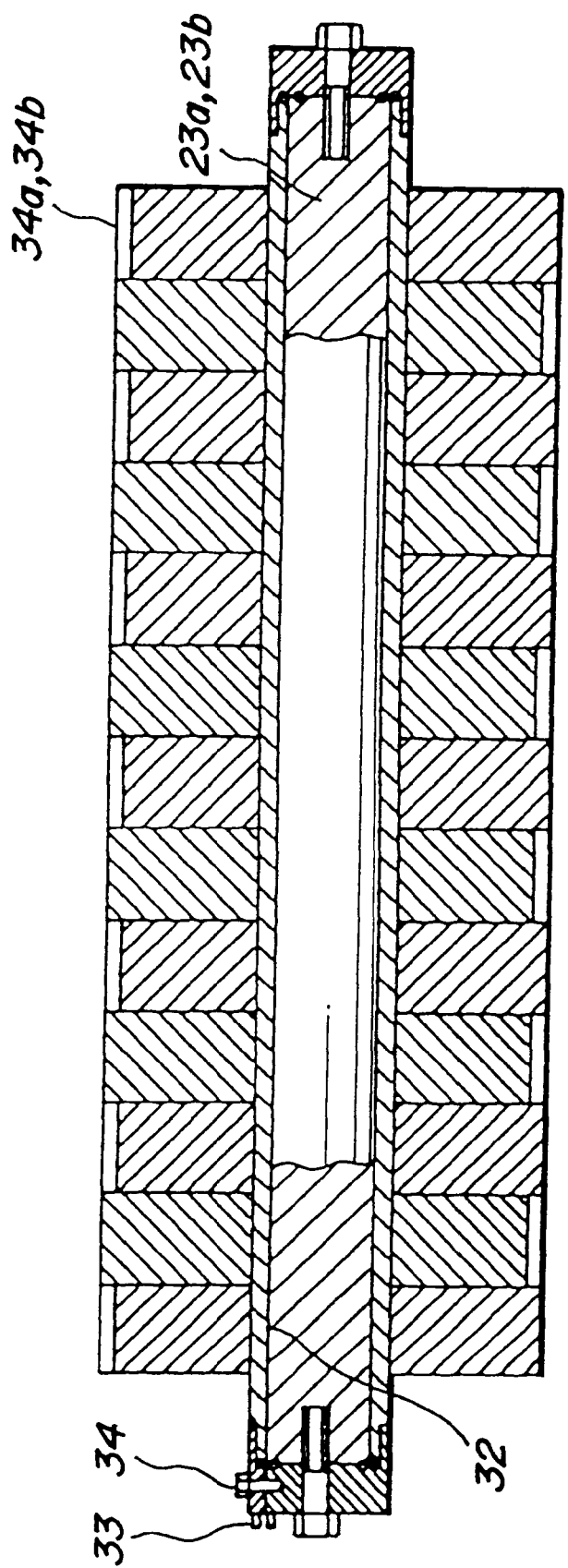
FIG. 16 is a view for illustrating a construction of another rotary drum for the apparatus in accordance with the present invention.

FIG. 16 shows a rotary drum which is so constructed that a portion near the outer periphery of shaft is made a hollow 32 except for the shaft end in the interior of the main shaft 23a, 23b, a liquid such as oil is supplied to the hollow through the supply port 33, and the pressure in the main shaft 23a, 23b is increased after mounting the disks $i_1 \ldots i_i$ to expand the shaft diameter, by which the disks are fixed firmly to the main shaft. This construction can relax the working accuracy of inside diameter of disk fitted to the main shaft within the range of expansion allowance of main shaft. If the supply port 33 is closed by a screw 34 after the expansion of main shaft, the expansion of main shaft can be maintained easily.

Figure 17:
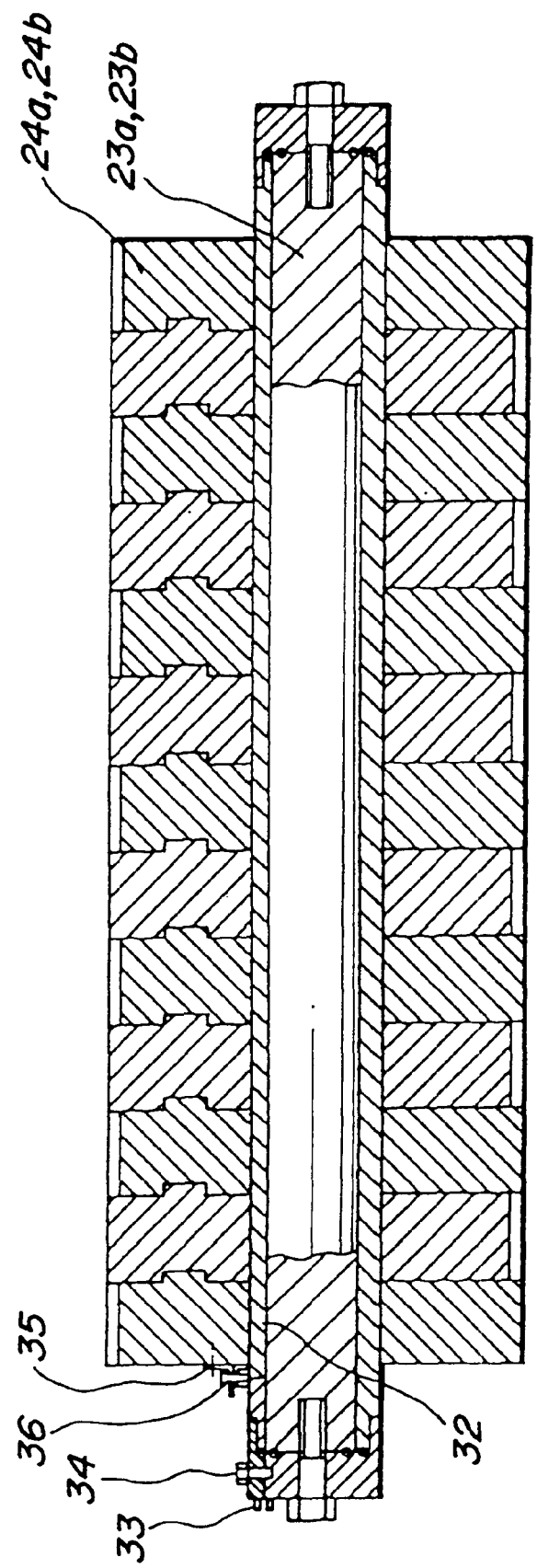
FIG. 17 is a view for illustrating a construction of still another rotary drum for the apparatus in accordance with the present invention.

FIG. 17 shows an example in which a contracting mechanism is provided such that when there is a possibility of damage to cutting edge caused by the application of an excessive load on the disk in surface cutting of sheets etc., the pressure in the main shaft 23a, 23b is reduced to instantly decrease the shaft diameter.

Figure 18A:
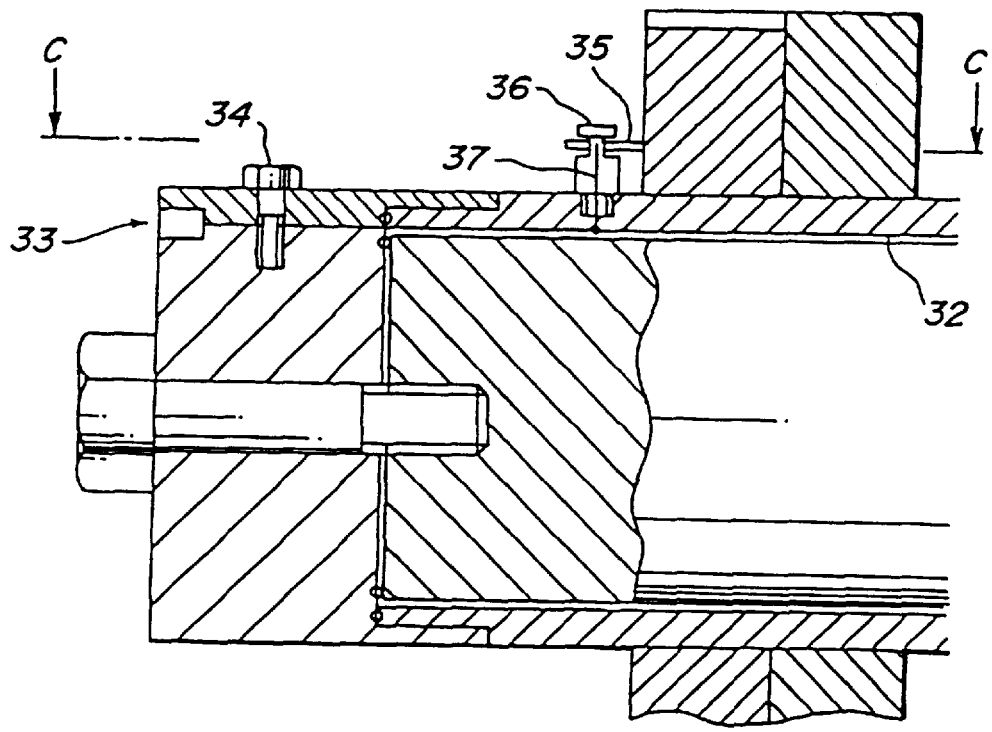
FIGS. 18(*a*) and 18(*b*) are enlarged views of principal portion of the rotary drum shown in FIG. 17.
Figure 18B:
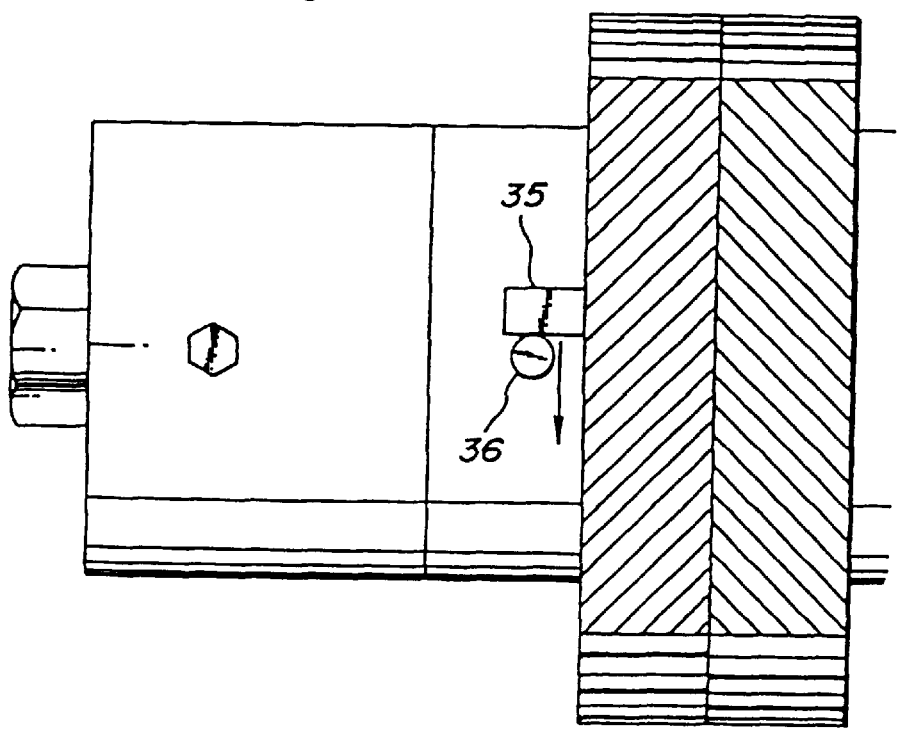

FIGS. 18(a) and 18(b) show the principal portion of FIG. 17. The contracting mechanism consists of a striker 35 which is fixed and held on the side of disk and a plug 36 installed on the main shaft. If an excessive load is applied to the disks $i_1 \ldots i_i$ and a slip occurs between the disks $i_1 \ldots i_i$ and the main shaft 23a, 23b, the striker 35 installed on the side of disk collides with the plug 36 on the main shaft, so that the plug 36 comes off. Thereby, the liquid such as oil in the main shaft is discharged, resulting in the contraction of shaft diameter.

Figure 21A:
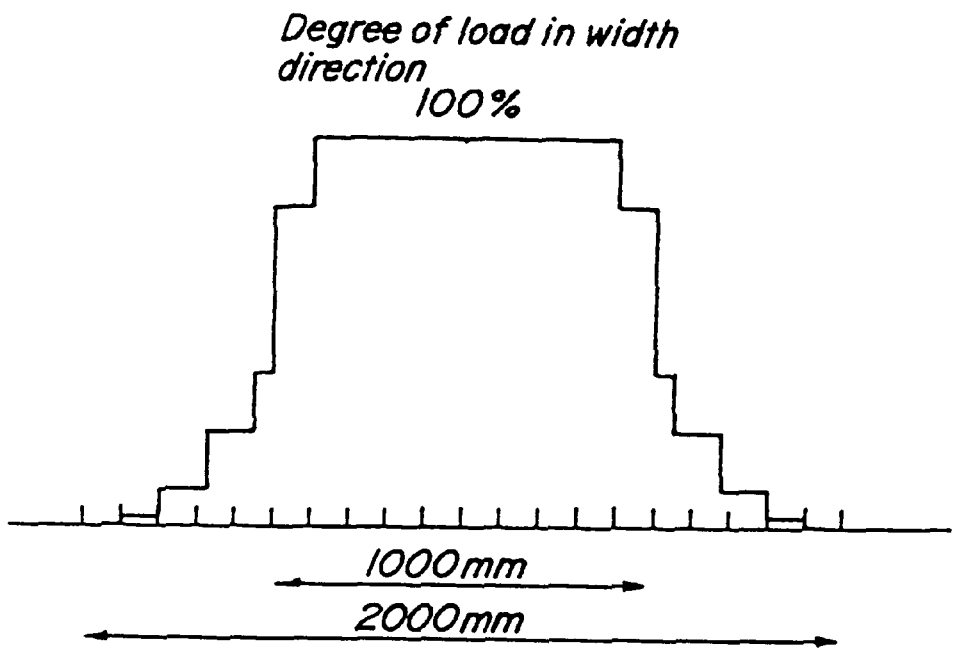
FIG. 21(*a*) is a diagram showing a load degree of rotary drum in the drum width direction, and FIG. 21(*b*) is a view showing the outside diameter of rotary drum.
Figure 21B:
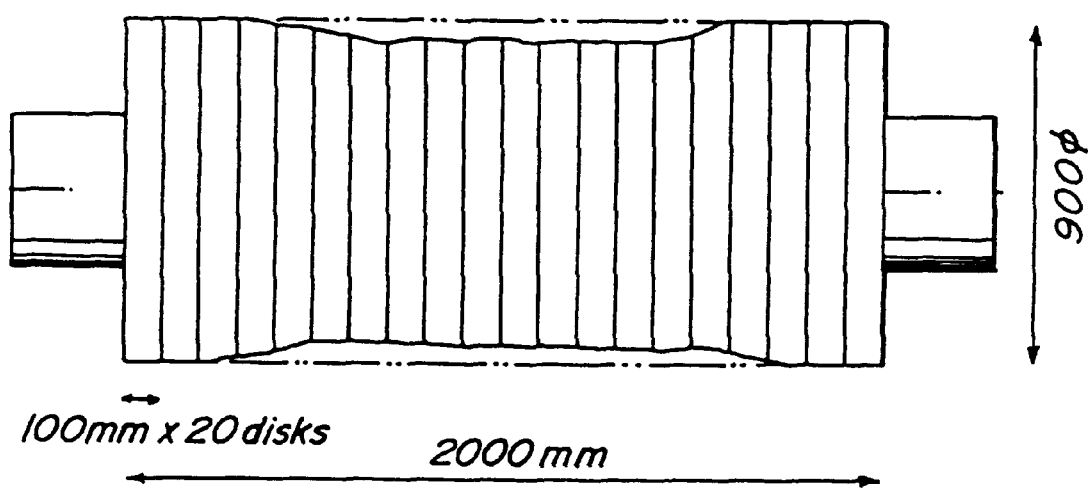

FIG. 19 shows an example of rising/lowering pattern of rotary drum (the pattern of only the rotary drum positioned on the upper side of the sheet is shown). FIG. 20 shows a cutting state of a sheet. FIGS. 21(a) and 21(b) show a wearing state of cutting edge of the rotary drum in the case where sheet surface cutting was performed by installing 20 disks with a diameter of 900 mm and a thickness of 100 mm on the main shaft.

The projections on the joined sheet bars (heating temperature: 1470° C., pressing force: 2 kgf/mm$^2$) were removed by cutting (circumferential speed of rotary drum: 100 m/s) in accordance with the pattern shown in FIG. 19 by using a cutting apparatus having rotary drums of the construction shown in FIG. 12 in which 20 disks (made of S55C) with a diameter of 900 mm, a thickness of 100 mm, a cutting edge pitch of 18.84 mm, and the number of cutting edges of 150 were arranged on a main shaft (shift of adjacent cutting edges: 9.42 mm). As a result, it was confirmed that although the time taken for the replacement of the rotary drum was usually about 48 hours, only about 8 hours are required for the replacement of disks in the present invention, so that the present invention is advantageous in improving the work efficiency.

The following is a description of a case where excessive cutting caused by the damage to cutting edge especially by operation error of the cutting apparatus and the excessive pressing against the sheet, which is an object to be cut, is avoided by using the means described in the above items 10) and 11).

In an apparatus having a sheet cutting rotary drum such as a milling cutter and grinding wheel, the outside diameter of the drum measured off-line is inputted to a computer by the operator, and the rotary drums are moved vertically based on the inputted information to adjust the position, by which a predetermined pressing amount is given to the cutting edge or grinding stone (specifically, the level of cutting edge or grinding stone face of the rotary drum is made to coincide with the level of sheet surface, that is, so-called zero adjustment is made, and then the rotary drum is moved from this state so as to obtain a predetermined working allowance). In the state in which the rotary drum is being rotated at a high speed for cutting, the position of cutting edge or grinding stone face of the rotary drum cannot be checked, so that exact zero adjustment cannot be made. Therefore, the working allowance of sheet exceeds the allowable range, or inversely the target working allowance cannot be obtained because the wear of cutting edge or grinding stone is higher than expected, so that working must be performed again. In particular, if the sheet is broken by the rotary drums because of the error of input to computer by the operator (for example, error of setting of rotary drum diameter) or the failure of a servo valve etc. of the cylinder for vertical movement, the cutting edges or grinding stones of the rotary drum are brought into contact with each other, resulting in an accident of damage to rotary drum.

According to the present invention, the apparatus, in which a sheet is passed between a pair of rotary drums rotating in the direction reverse to each other and the top and bottom surfaces thereof is cut continuously or intermittently, is configured so that a disk for recognizing gap between drums having a larger diameter than that of the rotary drum is arranged at both ends or at one end of at least one rotary drum. This drum is brought into contact with the disk of the other rotary drum, and zero adjustment is made with this state being a reference. Thereby, the error of working amount caused by excessive pressing of rotary drum can be decreased greatly. Also, even if there is an input error of disk outside diameter, the load becomes excessive by the contact between disks, so that the input error can be recognized in the screw down system before the sheet is cut.

In the case where a measuring means (non-contact type distance meter, eddy-current type sensor, etc.) which can find the wear amount (outside diameter of cutting edge on rotary drum) of rotary drum is provided in place of the disk, even if a wear of cutting edge or grinding stone is produced by the cutting of sheet, the rotary drums can be moved vertically on the line exactly by the wear amount (however, the speed of rotary drum is low). Therefore, more precise working can be performed than following the planned allowance. As the measuring means, an eddy-current type sensor, a laser type distance sensor, etc. can be used. The eddy-current type sensor measures a distance by detecting the current value changing according to the distance between the measuring means and the ferrous cutting edge by using eddy current. The laser type distance sensor measures a distance by detecting a reflected wave of laser beam irradiated on the cutting edge or grinding stone face by using laser beam.

At the outer periphery of rotary drum, cutting edges or grinding stones are arranged in accordance with the sheet to be cut. For example, when scratches or dents of hot-rolled steel, projections of steel product joint portion, etc. are treated, a milling cutter cutting edge is used. When pushing flaws of cold-rolled steel, oscillation marks of hot-rolled steel, slight dents, etc. are treated, a grinding stone is used.

FIG. 22 shows a configuration of the cutting apparatus in accordance with the present invention. In this figure, reference numerals 38*a* and 38*b* denote rotary drums arranged so as to cut the top and bottom surfaces of the sheet $S_1$, $S_2$ continuously or intermittently by holding the sheet therebetween (a rotary drum can be used, for example, which is configured so that a plurality of disks having cutting edges at the outer periphery thereof are arranged along the rotating shaft of the drum and the positions of cutting edges on the adjacent disks are shifted alternately.), 39*a* and 39*b* denote disks for recognizing gap between drums shown in the example in which the disk is arranged at both ends of the rotary drum 38*a*, 38*b*, 40 denotes a shaft case for containing a bearing rotatably supporting the rotary drum, 41 denotes a screw down cylinder, 42 denotes a housing, 43 denotes a spindle, 44 denotes a pinion stand, and 45 denotes an electric motor.

In order to surface-cut a sheet with a predetermined allowance, the disks 39*a* and 39*b* are brought into contact with each other by moving the rotary drums 38*a* and 38*b* to find the vertical absolute positions of cutting edges of the rotary drums (zero adjustment). Subsequently, the rotary drums 38*a* and 38*b* are rotated to a predetermined speed, and the rotary drums 38*a* and 38*b* are moved from that position to the same level as that of the top and bottom surfaces of the sheet S ($S_1$, $S_2$) respectively, and then the movement of the rotary drums 38*a* and 38*b* is stopped at the point of time when the level such that the predetermined cutting allowance can be obtained is reached. The sheet 1 passing between the pair of rotary drums is cut by the cutting edge or grinding stone at the outer periphery of the rotary drum. Although there is fear of too large allowance caused, for example, by the setting error of initial position of the rotary drum 38*a*, 38*b*, excessive cutting or grinding of sheet can be prevented by bringing the disks 39*a* and 39*b* installed at the end of the rotary drums 38*a* and 38*b* into contact with each other in the state of maximum cutting allowance.

Figure 23:
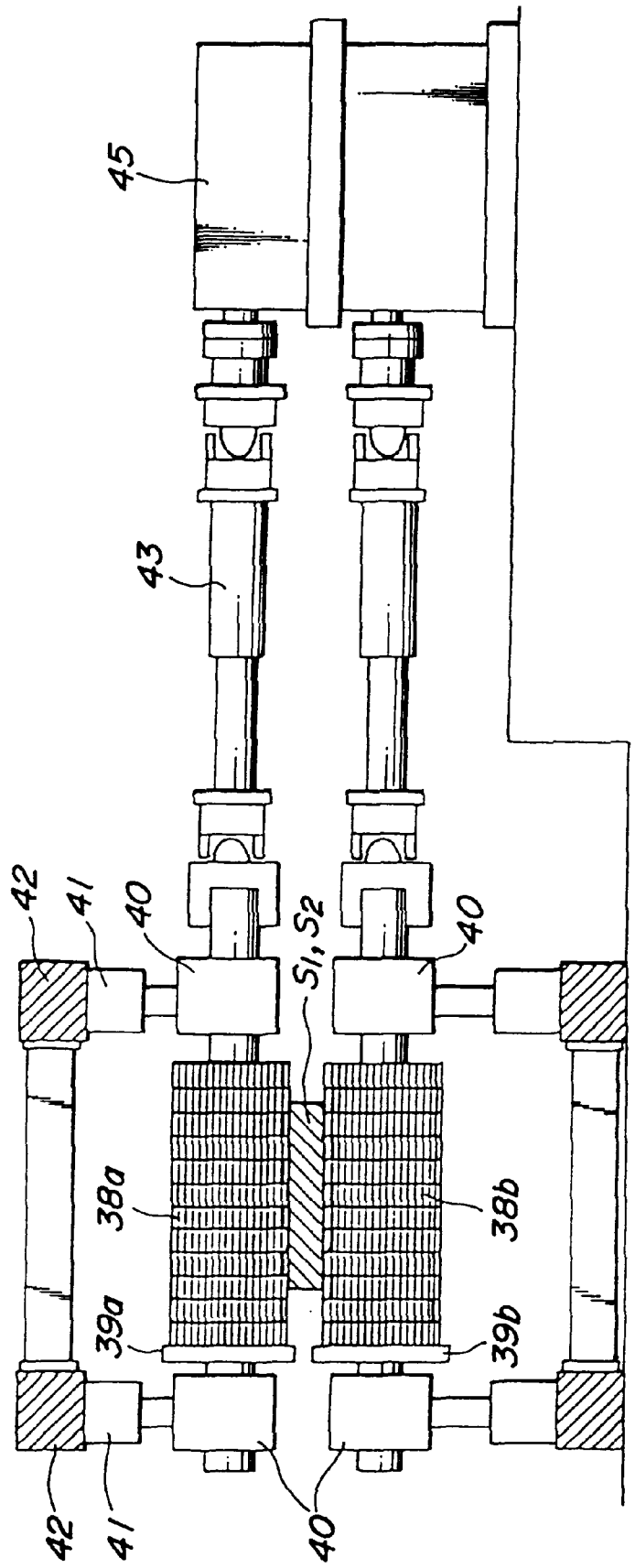
FIG. 23 is a view showing another configuration of the apparatus in accordance with the present invention, which can prevent the breakage of cutting edge and can recognize the gap between drums.

In the present invention, as shown in FIG. 23, the disk 39*a*, 39*b* may be installed only at one end of the rotary drum 38*a*, 38*b*. Also, in place of the disk 39*a*, 39*b*, as shown in FIGS. 24 and 25, several measuring means 46 may be arranged along the axial direction of at least one rotary drum. FIG. 24 shows an example in which the measuring means 46 are arranged on the upside only, while FIG. 25 shows an example in which the measuring means are arranged on both the upside and downside. It is best that the measuring means 46 be arranged on the upside of the rotary drum, but they may be arranged on both the upside and downside, or they may be arranged on the downside only. The measuring means on the downside is required to strictly take waterproof measures when cooling water is used for cutting or grinding and dustproof measures against chips as compared with the measuring means on the upside. By making zero adjustment by grasping the wearing state of cutting edge or grinding stone at the outer periphery of rotary drum using the measuring means 46, excessive cutting or grinding of sheet can be avoided. By disposing a cylinder on the measuring means 46 so that the measuring means can move close to or apart from the rotary drum, an accident of contacting the measuring means 46 with the rotary drum 38*a* caused when the rotary drum is moved can be prevented. Also, the measuring means 46 may be constructed so as to be capable of moving in the width direction of sheet S.

Figure 26A:
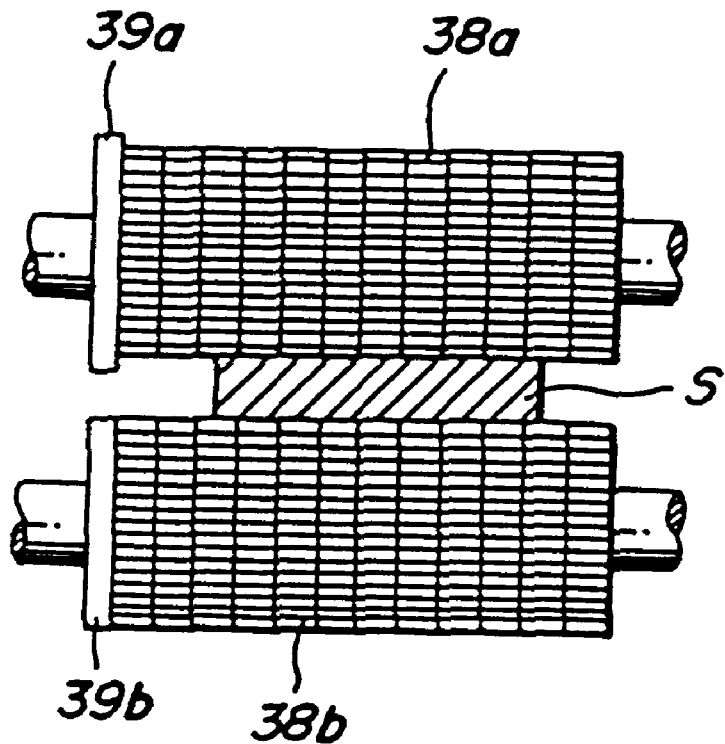
FIG. 26 is a view showing another example of cutting apparatus in accordance with the present invention.
Figure 26B:
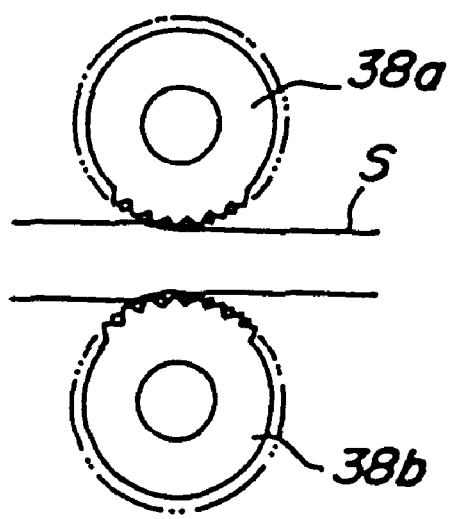

FIG. 26 shows another example of apparatus in accordance with the present invention.

Although the disk 39*a*, 39*b*, which is provided only on one side of the rotary drum 38*a*, 38*b*, shown in FIG. 23, has a larger diameter than that of the rotary drum, the diameter of the disk 39*b* is equal to or smaller than the diameter of the rotary drum 38*b*. Moreover, when the upper and lower rotary drums are brought close to each other by the screw down cylinders, the disk 39*a* and the disk 39*b* come in contact with each other before the rotary drum 38*a* and the rotary drum 38*b* come in contact with each other. In the case where the diameter of the disk 39*a* is different from that of the disk 39*b*, when the upper and lower rotary drums are rotated at the same rotational speed, a difference in circumferential speed occurs on the aforementioned disks, so that there is a possibility of damage to disk caused by frictional heat generation. Therefore, adjustment including zero adjustment should be made without rotating the drum.

An example of specific procedure for zero adjustment is shown in FIG. 27. The gap between the upper and lower rotary drums is decreased with the command of zero adjustment start, and when a load is applied by hydraulic reduction, screw down is performed to the expected position (40 t load is applied when the disk width is 150 mm). After it is confirmed that the oil column value calculated from the outside diameter of rotary drum agrees with the actual oil column value, the cutting edge is rotated, and it is confirmed that the load deviation caused by disk eccentricity is not larger than ±2 t. Thus, zero adjustment is completed.

The wear amount at the tip end of rotary drum 38*a*, 38*b* is measured by the measuring means 46 as shown in FIG. 24, and the upper rotary drum 38*a* is moved downward and the lower rotary drum 38*b* is moved upward by the wear amount, by which a constant working amount can always be maintained.

When the cutting edge or grinding stone wears eccentrically, uniform working sometimes cannot be performed in working sheets with a different width by simply moving the rotary drums up or down. Therefore, the rotary drum is replaced, or the disks subjected to heavy eccentric wear are replaced for the rotary drum which is configured so that disks having cutting edges etc. at the outer periphery thereof are combined.

Such zero adjustment can be made not only on-line but also off-line. In either case, a trouble caused by input error does not occur.

Next, effective recovery of high-temperature chips produced in sheet surface cutting, which is performed by the means described in the above items 12) and 13), will be described especially for an example of the case where a preceding sheet and a following sheet are joined and hot-rolled continuously.

Figure 28:
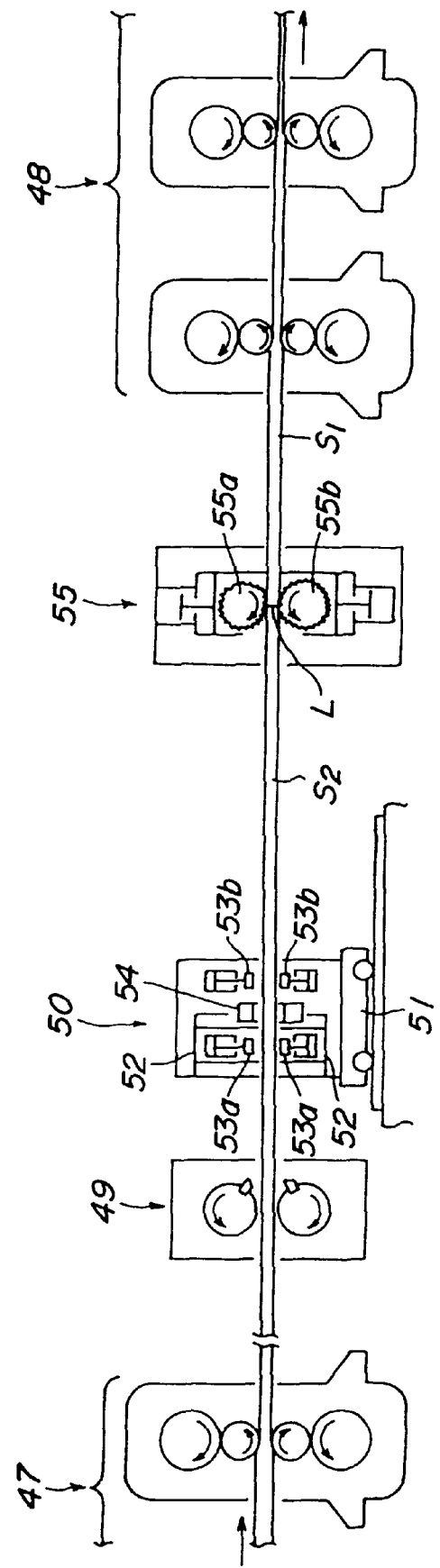
FIG. 28 is a view showing a typical arrangement of apparatuses for a continuous hot rolling facility.

As shown in FIG. 28, a crop shear 49 is installed on the downstream side of rough rolling mill group 47 between the rough rolling mill group 47 and a finish rolling mill 48. The crops at the tail edge of preceding sheet $S_1$ and the leading edge of following sheet S2 are cut and removed by the crop shear 49. A joining device 50 is installed on the downstream side of the crop shear 49. The tail edge of preceding sheet $S_1$ and the leading edge of following sheet $S_2$ are joined to each other by the joining device 50. Specifically, the joining device 50 is moved at the same speed as the advance speed of preceding sheet $S_1$ and following sheet $S_2$ by using a carrier 51, and the leading edge of following sheet $S_2$ is clamped by an input-side clamp 53a in an inner frame 52 and the tail edge of preceding sheet $S_1$ is clamped by an output-side clamp 53b. In this state, the joint portion is heated by a heater 54, which uses eddy current of a high frequency coil, for example. By moving the inner frame 52 to the output side, the tail edge of preceding sheet $S_1$ and the leading edge of following sheet S2 are pressed in the advance direction and joined.

Figure 29:
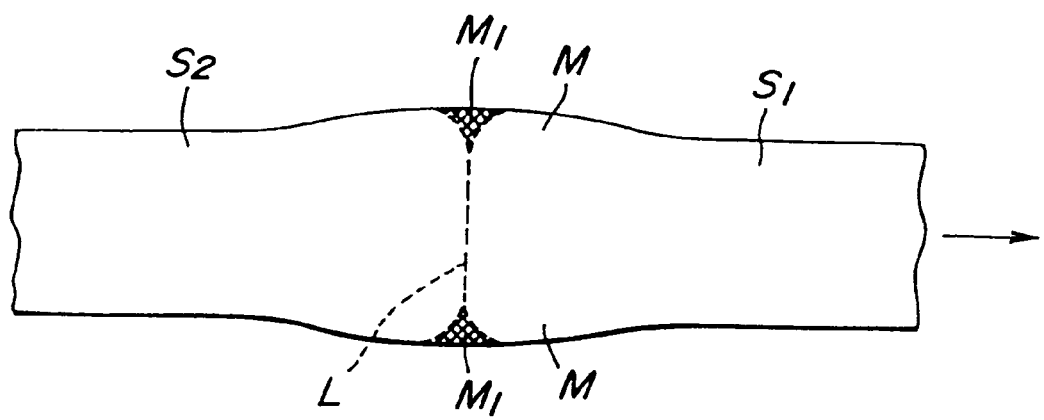
FIG. 29 is a view showing a state of the joint portion of steel products when continuous hot rolling is performed.
Figure 30:
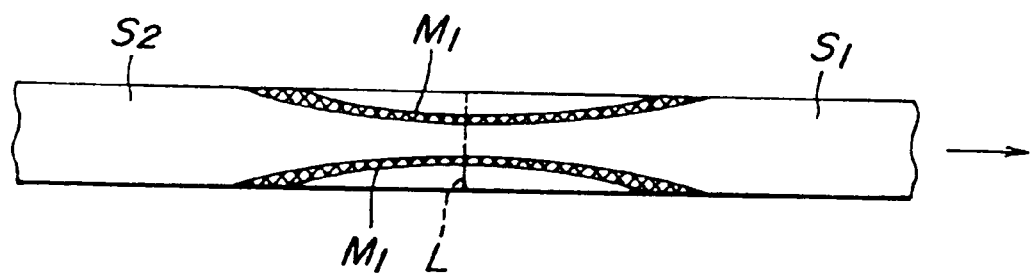
FIG. 30 is a view showing a state in which the joint portion shown in FIG. 29 has been rolled.
Figure 31:
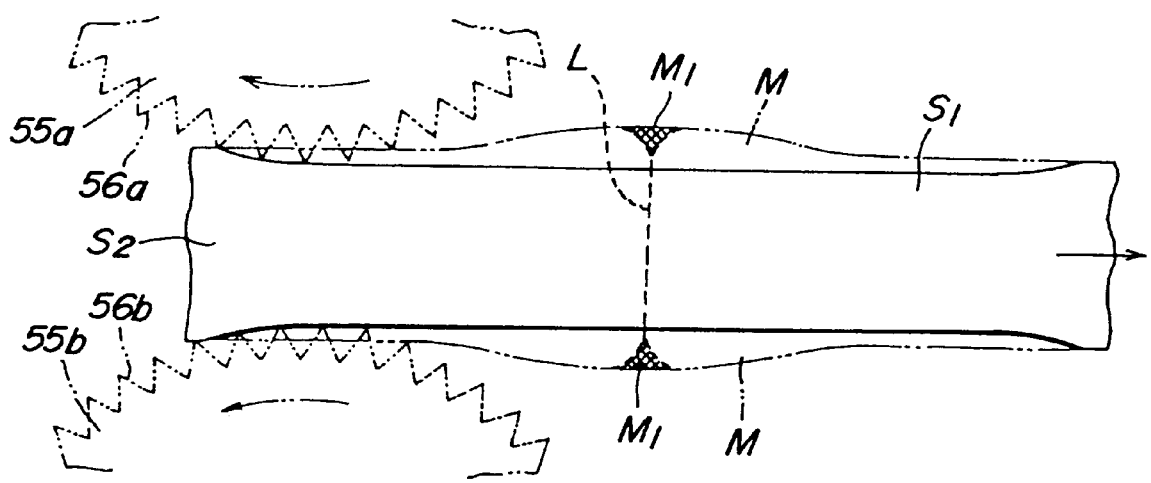
FIG. 31 is a view showing a state in which the joint portion of steel product is cut.
Figure 32:
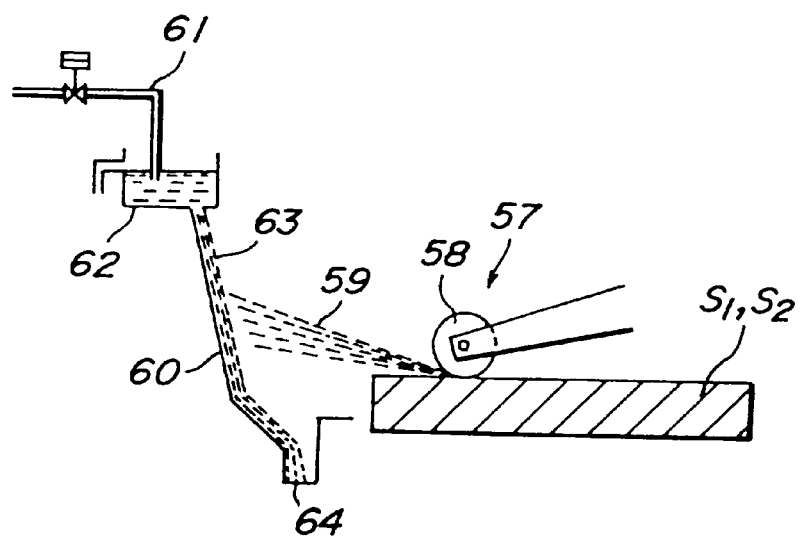
FIG. 32 is a view showing a state in which chips produced in cutting steel products are disposed.

A cutting apparatus 55 for removing projections is installed on the downstream side of the joining device 50. The projections at the joint portion between the tail edge of preceding sheet $S_1$ and the leading edge of following sheet $S_2$ are removed by the apparatus 55. Specifically on the top and bottom surfaces of the joint portion L between the tail edge of preceding sheet $S_1$ and the leading edge of following sheet $S_2$, as shown in FIG. 29, projections M are produced by the compression caused by press joining. At this projection M, foreign matters $M_1$ such as scale aggregate. If the sheet with the projections M is rolled into a finish rolled product by the finish rolling mill group 48, as shown in FIG. 30, the foreign matters $M_1$ are extended and remain in the finish rolled product over a long range. If the foreign matters $M_1$ remain in the finish rolled product, the strength of joint portion is remarkably decreased by the foreign matters $M_1$. Therefore, the projections at the joint portion are removed by the cutting apparatus 55. The cutting apparatus 55 is provided with a pair of rotary drums 55a and 55b holding a sheet therebetween, and as shown in FIG. 31, the projections M at the joint portion are cut and removed by the cutting edges 56a and 56b on the rotary drums 55a and 55b. When the projections M of sheet is removed by the cutting apparatus 55, high-temperature chips scatter at a high speed on the rotation side of cutting edge 56a, 56b (upstream side in the figure) and adhere to the surface of sheet, so that there is fear of degraded quality. On the output side of the cutting apparatus 55, therefore, a chip removing device 57 as shown in FIG. 32 is provided. As shown in FIG. 32, a rotating grinding stone 58 movable in the sheet width direction is provided. The surface of sheet is ground by the rotating grinding stone 58, and chips 59 are scattered in the sheet side direction. On the other hand, a dust collecting hood 60 is provided at the width end of sheet. In the dust collecting hood 60, water is supplied in a laminar flow form via a supply pipe 61 and a water tank 62, so that a water film 63 is formed over the wall surface. The high-temperature chips 59 scattering toward the dust collecting hood 60 in the sheet side direction when the sheet is ground by the rotating grinding stone 58 are trapped by the water film 63, cooled and dropped, and recovered in a pit (not shown) together with water through a drainage channel 64.

Thus, in the continuous hot rolling facility, measures are taken to prevent the high-temperature chips produced when the sheet surface is cut by the cutting apparatus 55 from adhering to the sheet. However, the chip removing device 57, which disposes chips in the sheet width direction, requires the dust collecting hood 60 having a large wall surface, which is disadvantageous in terms of space. The cutting apparatus 55 is provided with the rotary drums 55a and 55b on the upside and downside of sheet. For the lower rotary drum 55b, the water film 63 or waterdrops which flow down cannot be formed. Therefore, the chip removing device 57 is now installed near the upper rotary drum 55a only.

In the present invention, in particular, the cutting apparatus is configured so that the rotary drums having a width larger than the maximum sheet width are arranged above and below the sheet, the upper rotary drum is supported by a chock moved vertically by a screw down cylinder, the lower rotary drum is supported by a chock moved vertically by a height adjusting cylinder, an upper chip discharge means is provided on the chip discharge side of the upper rotary drum, and a lower chip discharge means is provided on the chip discharge side of the lower rotary drum. Thereupon, the chips produced in sheet surface cutting can be recovered without an increase in facility size. Also, in the present invention, a flowing water injecting means is provided in each of upper chip discharge means and lower chip discharge means, so that the chips can be cooled rapidly, by which the chips can be recovered efficiently.

Figure 33:
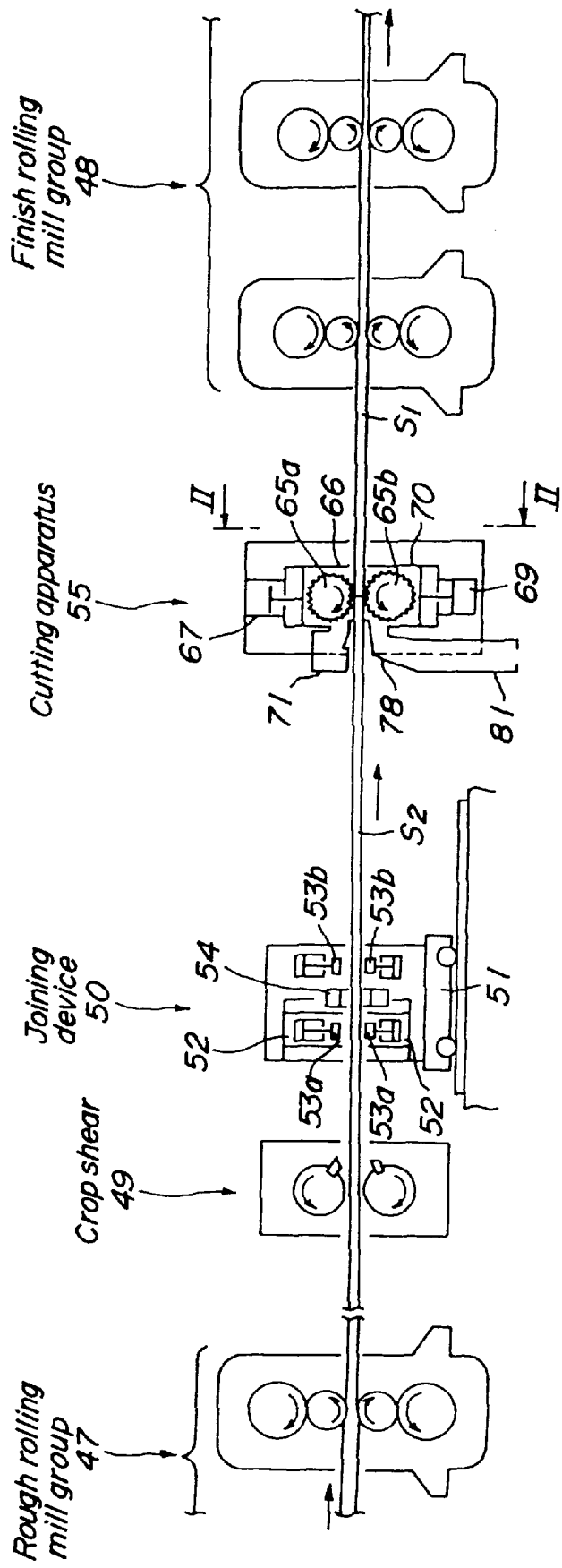
FIG. 33 is a view showing a configuration of a continuous hot rolling facility in which the cutting apparatus in accordance with the present invention is arranged.
Figure 34:
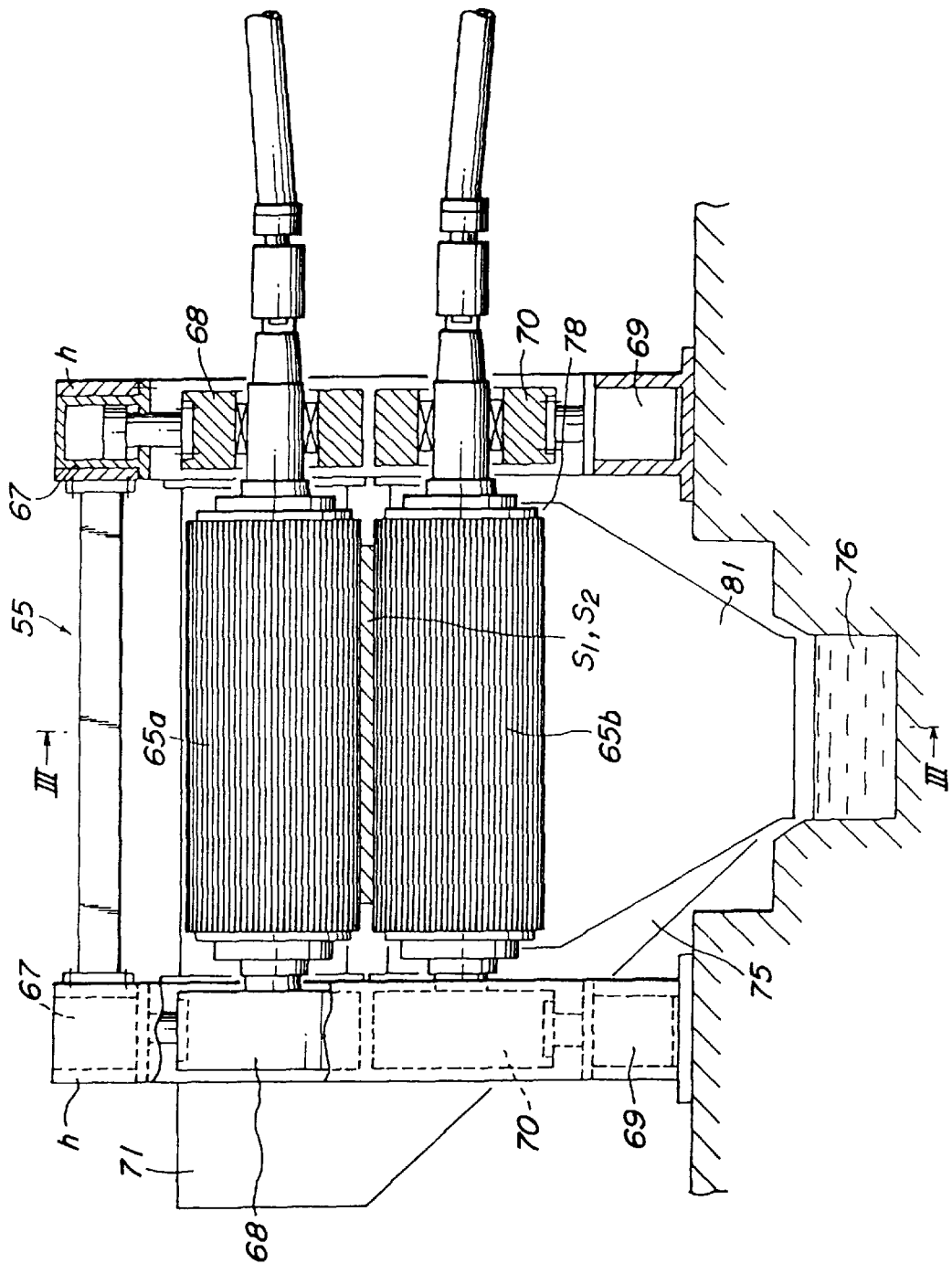
FIG. 34 is a view taken along the line II—II of FIG. 33.
Figure 35:
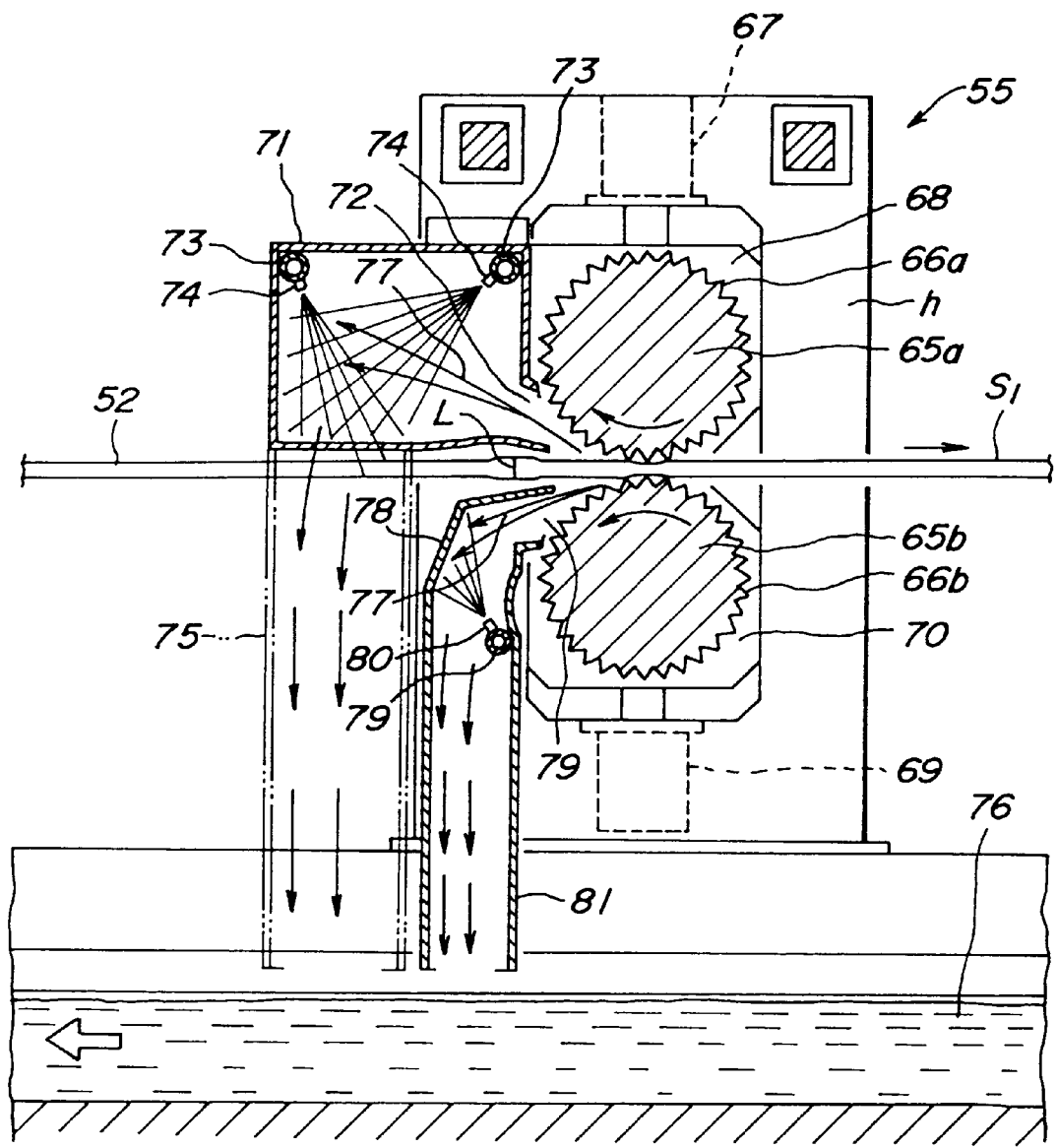
FIG. 35 is a view taken along the line III—III of FIG. 34.

FIG. 33 is a side view showing the concept of a continuous hot rolling facility. FIG. 34 is a view taken along the line II—II of FIG. 33, and FIG. 35 is a view taken along the line III—III of FIG. 34. In FIG. 33, a crop shear 49 is installed on the downstream side of a rough rolling mill group 47. The crops at the tail edge of preceding sheet $S_1$ and the leading edge of following sheet $S_2$ are cut and removed by the crop shear 49. A joining device 50 is installed on the downstream side of the crop shear 49. The tail edge of preceding sheet $S_1$ and the leading edge of following sheet $S_2$ are joined to each other by the joining device 50. A cutting apparatus 55 is provided between the joining device 50 and a finish rolling mill group 48. The projections at the joint portion L are cut and removed by the apparatus 55.

The cutting apparatus 55 is provided with a pair of rotary drums 65a and 65b holding a sheet therebetween. The rotary drum 65a, 65b is formed with cutting edges 66a, 66b with a width larger than the maximum sheet width of rolled product at the outer periphery thereof. A roll chock 68 is supported by a housing h of the cutting apparatus 55 via a screw down cylinder 67 so as to be movable vertically, and the upper rotary drum 65a is rotatably supported by the roll chocks 68. Also, a roll chock 70 is supported by the housing h via a height adjusting cylinder 69 so as to be movable vertically, and the lower rotary drum 65b is rotatably supported by the roll chocks 70.

An upper chip discharge duct 71 is provided as an upper chip discharge means near the rear side in the rotating direction of the upper rotary drum 65a. The upper chip discharge duct 71 is formed with an opening 72 which opens on the downside of the rotary drum 65a and is wider than the rotary drum 65a. Flowing water injecting headers 73 are provided as flowing water injecting means in the upper chip discharge duct 71, and injection nozzles 74 of the flowing water injecting headers 73 are arranged so as to face downward. A discharge section 75 is provided in the upper chip discharge duct 71. The discharge section 75 extends from the working side of the rotary drum 65 (left side in FIG. 34) to a drainage channel 76. Chips 77 produced when a sheet is cut by the upper rotary drum 65a are recovered in the upper chip discharge duct 71 through the opening 72, and discharged into the drainage channel 76 by the injection of flowing water from the flowing water injecting headers 73. A lower chip discharge duct 78 is provided as a lower chip discharge means near the rear side in the rotating direction of the lower rotary drum 65b. The lower chip discharge duct 78 is formed with an opening 79 which opens on the upside of the rotary drum 65b and is wider than the rotary drum 65b. A flowing water injecting header 79 is provided as a flowing water injecting means in the lower chip discharge duct 78, and an injection nozzle 80 of the flowing water injecting headers 79 is arranged so as to face upward. A discharge section 81 is provided in the upper chip discharge duct 78. The discharge section 81 opens above the drainage channel 76. Chips 77 produced when a sheet is cut by the lower rotary drum 65b are collected and recovered in the lower chip discharge duct 78 through the opening 79, and discharged into the drainage channel 76 by the injection of flowing water from the flowing water injecting header 79.

In the above-described continuous hot rolling facility, the tail edge of preceding sheet $S_1$ and the leading edge of following sheet $S_2$ are joined to each other by the joining device 50, and the projections M at the joint portion L are cut and removed by the cutting edges 66a and 66b on the rotary drum 65a and 65b of the cutting apparatus 55 (see FIG. 31).

In the cutting apparatus 55, the height of the top surface of the lower rotary drum 65b is adjusted in advance by the height adjusting cylinder 69, and the upper and lower rotary drums 65a and 65b are rotated in the direction reverse to the advance direction of sheet. In cutting, the rotary drums 65a and 65b are moved close to each other by the screw down cylinder 67 and the height adjusting cylinder 69, respectively, by which foreign matters including aggregated scale at the joint portion L are cut and removed together with the projections M on both of the top and bottom surfaces at the same time (see FIG. 31).

The high-temperature chips 77 scattered to the input side at a high speed by the high-speed rotation of rotary drum during the cutting process are recovered in the upper chip discharge duct 75 and the lower chip discharge duct 78, cooled by the water injected from the injection nozzles 74 and 80 of the flowing water injecting headers 73 and 79, and discharged in the drainage channel 76 through the discharge sections 75 and 81. Thereupon, the projections M at the joint portion L on both the top and bottom surfaces of sheet can be cut and removed at the same time, and there is no possibility of adhesion of high-temperature chips 77 to other equipment etc.

The rotary drums 65a and 65b, which are rotated in the direction reverse to the advance direction of sheet in this example, may be rotated in the advance direction.

The following is a description of a case where surface cutting is achieved while a sheet is conveyed stably by preventing deformation of hot sheet, especially downward deformation of leading edge by using the means described in the above item 14).

Figure 36:
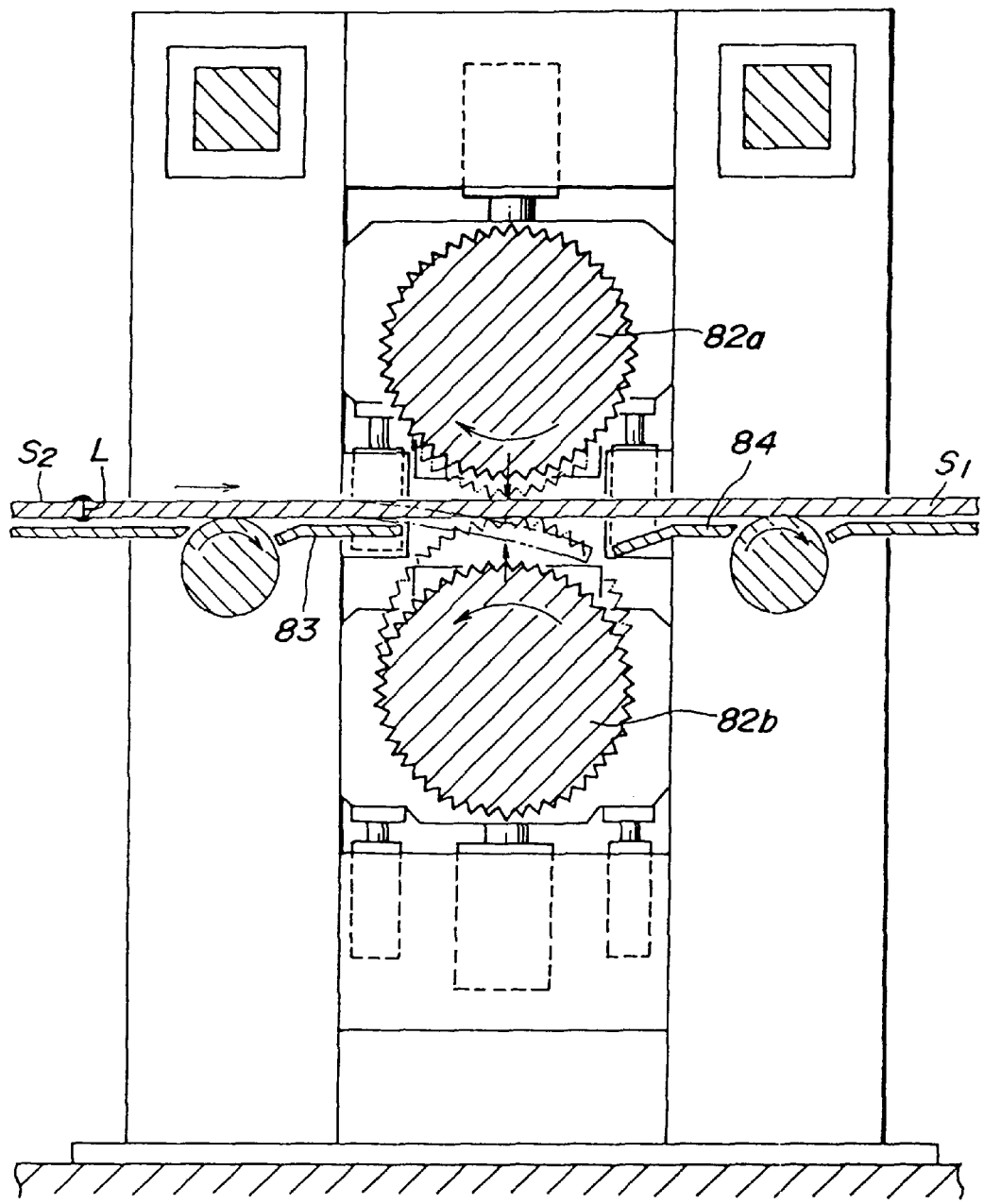
FIG. 36 is a view showing a state in which the leading edge of steel product hangs down.

FIG. 36 is a side view of a sheet surface cutting apparatus. In the apparatus thus configured, like the apparatus shown in FIG. 35, the heights of the rotary drums 82a and 82b are adjusted, the leading edge of preceding sheet $S_1$ is passed through the opposing section of a pair of rotary drums 82a and 82b, and the rotary drums 82a and 82b are moved close to each other while being rotated at a high speed just before the joint portion with the following sheet $S_2$ reaches the opposing section of the pair of rotary drums 82a and 82b, by which the projections at the joint portion L of sheet is cut. At this time, the preceding sheet $S_1$ passing between the pair of rotary drums 82a and 82b is at a temperature of about 800 to 900° C., so that the strength thereof is decreased. Therefore, there is a possibility that the leading edge of preceding sheet $S_1$ passing through an input-side apron 83 hangs down, as indicated by the two-dot chain line in the figure.

Since a fixing apron cannot be installed between the pair of rotary drums 82a and 82b, if the leading edge of following sheet $S_2$ hangs down, it comes in contact with an output-side apron 84 or the cutting edge of lower rotary drum, so that there is fear of damage to cutting edge of rotary drum or incapability of passing of sheet.

According to the present invention, in the apparatus for cutting the top and bottom surfaces continuously or intermittently by passing a hot sheet between the pair of rotary drums rotating in the direction reverse to each other, a movable sheet passing guide for holding the hot sheet for the period during which the leading edge of preceding sheet advances from the input side to the output side of the rotary drum. Until the leading edge of preceding sheet passes between the rotary drums and reaches the output-side apron, the sheet passing guide is inserted between the input-side apron and the output-side apron to guide the leading edge of preceding sheet by using the sheet passing guide. Therefore, the deformation of sheet, especially of the leading edge thereof, can be prevented, and the incapability of passing of sheet does not occur, so that the joint portion of sheet can be cut to a predetermined depth by setting a predetermined gap between the upper and lower rotary drums before the joint portion between the preceding and following sheets reaches the rotary drum.

Figure 37:
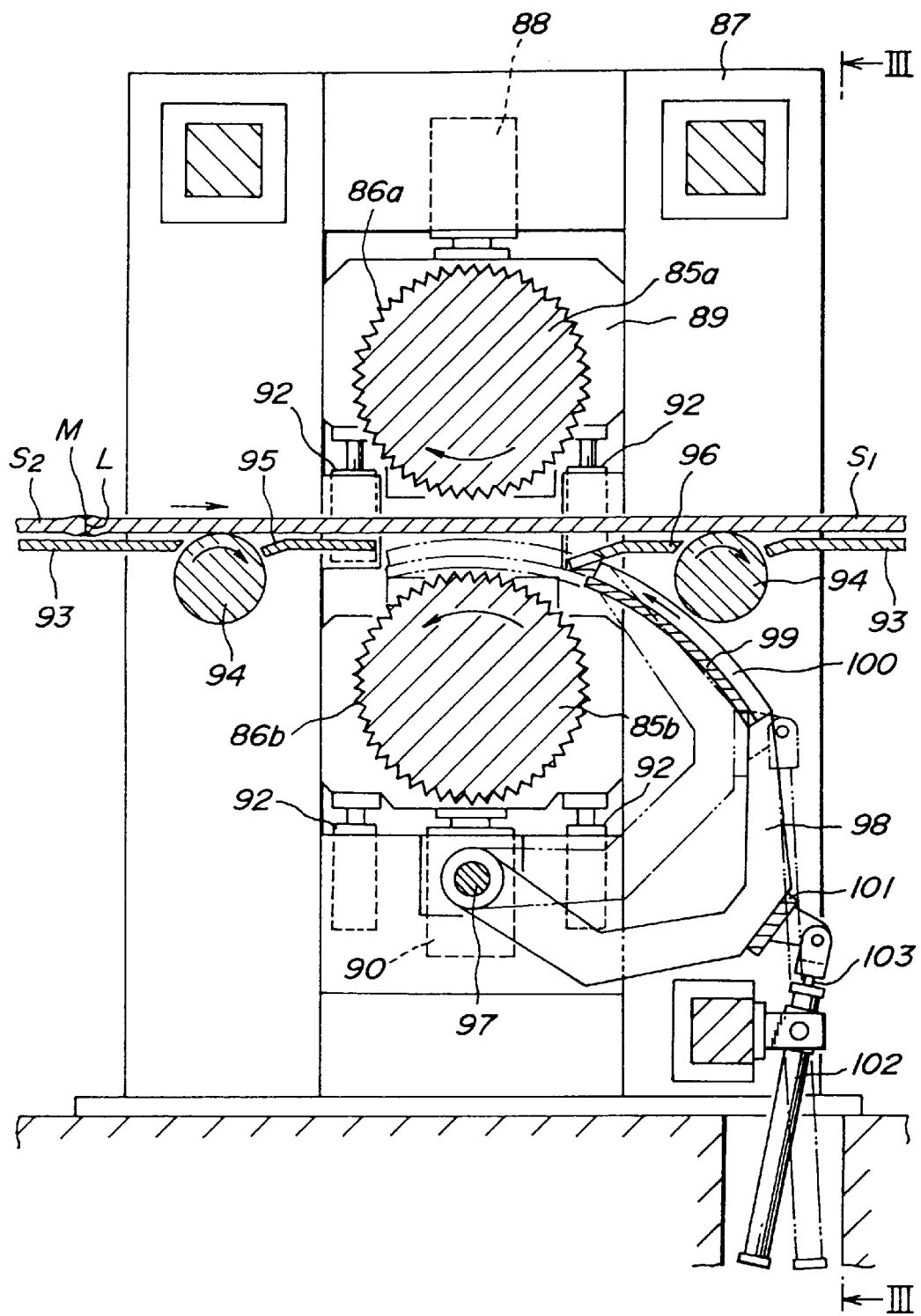
FIG. 37 is a view showing a configuration of the side of the cutting apparatus in accordance with the present invention.
Figure 38:
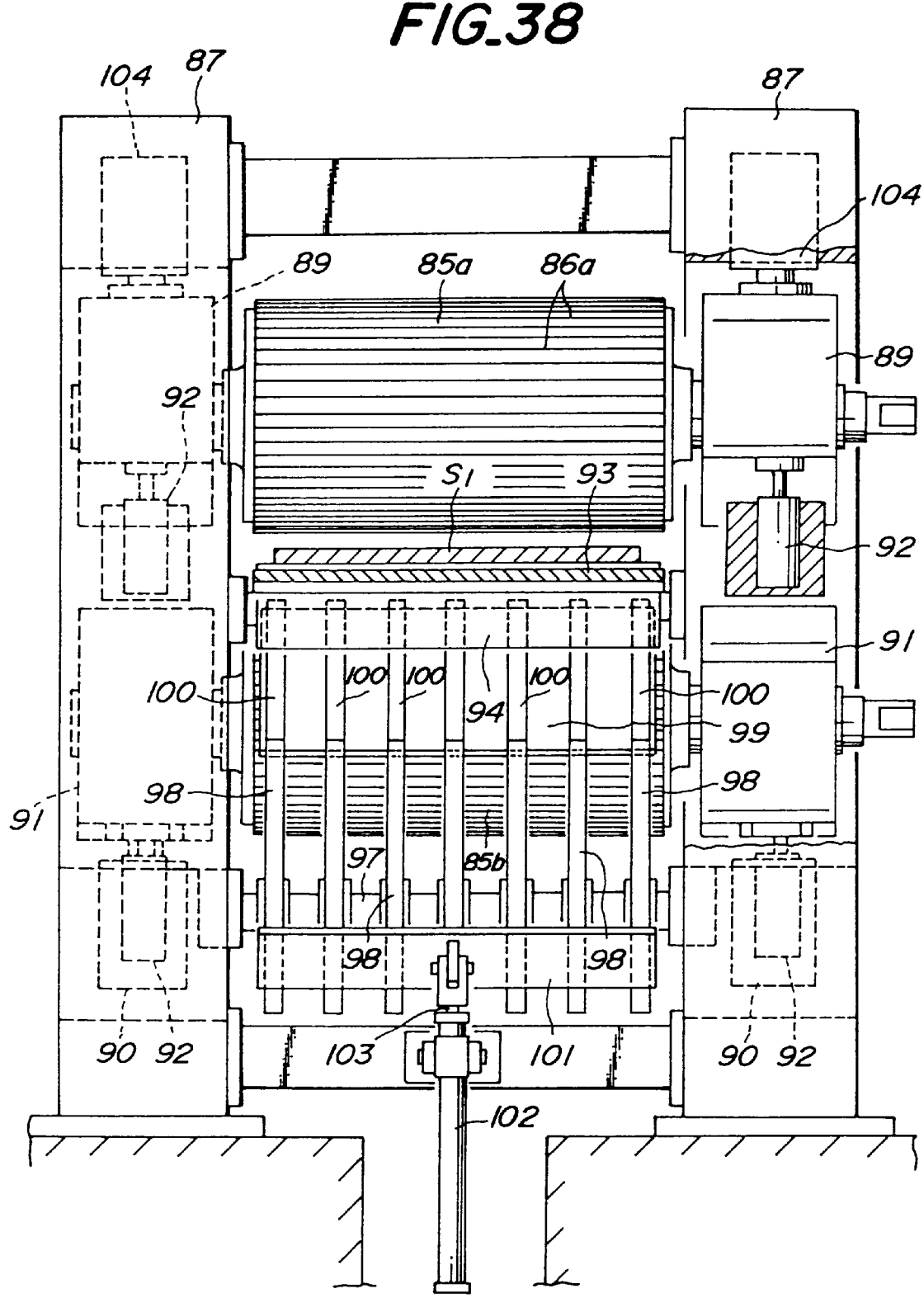
FIG. 38 is a view taken along the line III—III of FIG. 37.

FIGS. 37 and 38 show a configuration of cutting apparatus in accordance with the present invention. A pair of rotary drums 85a and 85b of the cutting apparatus is formed with cutting edges 86a and 86b with a width larger than the maximum sheet width on the outer peripheral surface. A roll chock 89 is supported by a housing 87 of the cutting apparatus via a screw down cylinder 88 so as to movable vertically, and the upper rotary drum 85a is rotatably supported by the roll chocks 89. Also, a roll chock 91 is supported by the housing 87 via a height adjusting cylinder 90 so as to be movable vertically, and the lower rotary drum 85b is rotatably supported by the roll chocks 91. The roll chocks 89 and 91 are supported by balance cylinders 92 respectively, so that the heights of the rotary drums 85a and 85b are adjusted. On the sheet pass line, an apron 93, a table roller 94, an input-side apron 95, an output-side apron 96, a table roller 94, and apron 93 are installed from the upstream side. The preceding sheet $S_1$ is carried from the input-side apron 95 to between the pair of rotary drums 85a and 85b by being guided by the input-side apron 93 and the table roller 94, and carried out by passing through the output-side apron 96 by being guided by the output-side apron 93 and the table roller 94.

As shown in FIGS. 37 and 38, at the lower part of the housing 87 is provided a center shaft 97 extending in parallel with the rotating shafts for the rotary drums 85a and 85b, and the base end of an arm 98 is rotatably supported by the center shaft 97. A plurality of rows of arms 98 extending toward the output-side direction are arranged in the axial direction of the rotary drum 85a, 85b, and a connection plate 99 is mounted at the tip end of the arm 98. The connection plate 99 is provided with arcuate sheet passing guides 100. A plurality of rows of sheet passing guides 100 are arranged in the axial direction of the rotary drum 85a, 85b. By turning the arms 98 around the center shaft 97, the sheet passing guides 100 are attached from or detached to the output side to or from between the pair of rotary drums 85a and 85b between the input-side apron 95 and the output-side apron 96, that is, between the lower rotary drum 85b and the sheet passing plane. A connection plate 101 is installed at the intermediate part of the arm 98, and an operating rod 103 of a turning cylinder 102 is pivotally mounted to the connection plate 101. Thus, by extending/contracting the operating rod 103 by the drive of the turning cylinder, the arms 98 are turned around the center shaft 97, so that the sheet passing guides 100 are attached to or detached from between the lower rotary drum 85b and the sheet passing plane.

Before a preceding sheet $S_1$ and a following sheet $S_2$ are joined, the upper and lower rotary drums 85a and 85b are apart from each other, and after the preceding sheet $S_1$ and the following sheet $S_2$ are joined, the operating rod 48 is extended by the drive of the turning cylinder 102 before the leading edge of preceding sheet $S_1$ reaches the cutting apparatus. By the extension of the operating rod 103, the arms 98 are turned around the center shaft 97, by which the sheet passing guides 100 are inserted between the lower rotary drum 85b and the sheet passing plane from the output direction (the state indicated by the two-dot chain line in FIG. 37). In this state, the leading edge of preceding sheet $S_1$ advances from the input-side apron 95 to the output-side apron 96 by being guided by the sheet passing guides 100 without dropping. When the leading edge of preceding sheet $S_1$ reaches the output-side table roller 94 and the apron 93, the operating rod 103 is contracted by the drive of the turning cylinder 102 to return the plate passing guides 100 to the original positions (the state indicated by the solid line in FIG. 37).

After the plate passing guides 100 are returned to the original positions, the heights of rotary drums are adjusted by the adjustments of the screw down cylinder 104 and the height adjusting cylinder 90. Just before the joint portion L of the preceding sheet $S_1$ and the following sheet $S_2$ reaches between the rotary drums 85a and 85b, the upper and lower rotary drums are rotated at a high speed in the direction reverse to the sheet advance direction. In cutting, the upper and lower rotary drums 85a and 85b are moved close to each other by the screw down cylinder 104 and the height adjusting cylinder 90, respectively, to cut the top and bottom surfaces at the same time while removing the projections M at the joint portion L.

In this example, the rotary drums 85a and 85b are rotated in the direction reverse to the sheet advance direction. However, they may be rotated in the sheet advance direction. Also, the sheet passing guides 100 are formed into an arcuate shape, and the sheet passing guides 100 are attached or detached by turning the arms 98 in this example. However, plate-shaped sheet passing guides may be attached to or detached from between the rotary drums by being slid.

Thus, in the present invention, movable sheet passing guides 100 are provided between the rotary drum and the sheet passing plane in the cutting apparatus, and the sheet passing guides 100 are inserted between the upper and lower rotary drums to guide the leading edge of preceding sheet $S_1$ when the leading edge of preceding sheet $S_1$ passes between the rotary drums. Therefore, the leading edge of preceding sheet does not come in contact with the output-side apron by high-temperature deformation etc.

Figure 39:
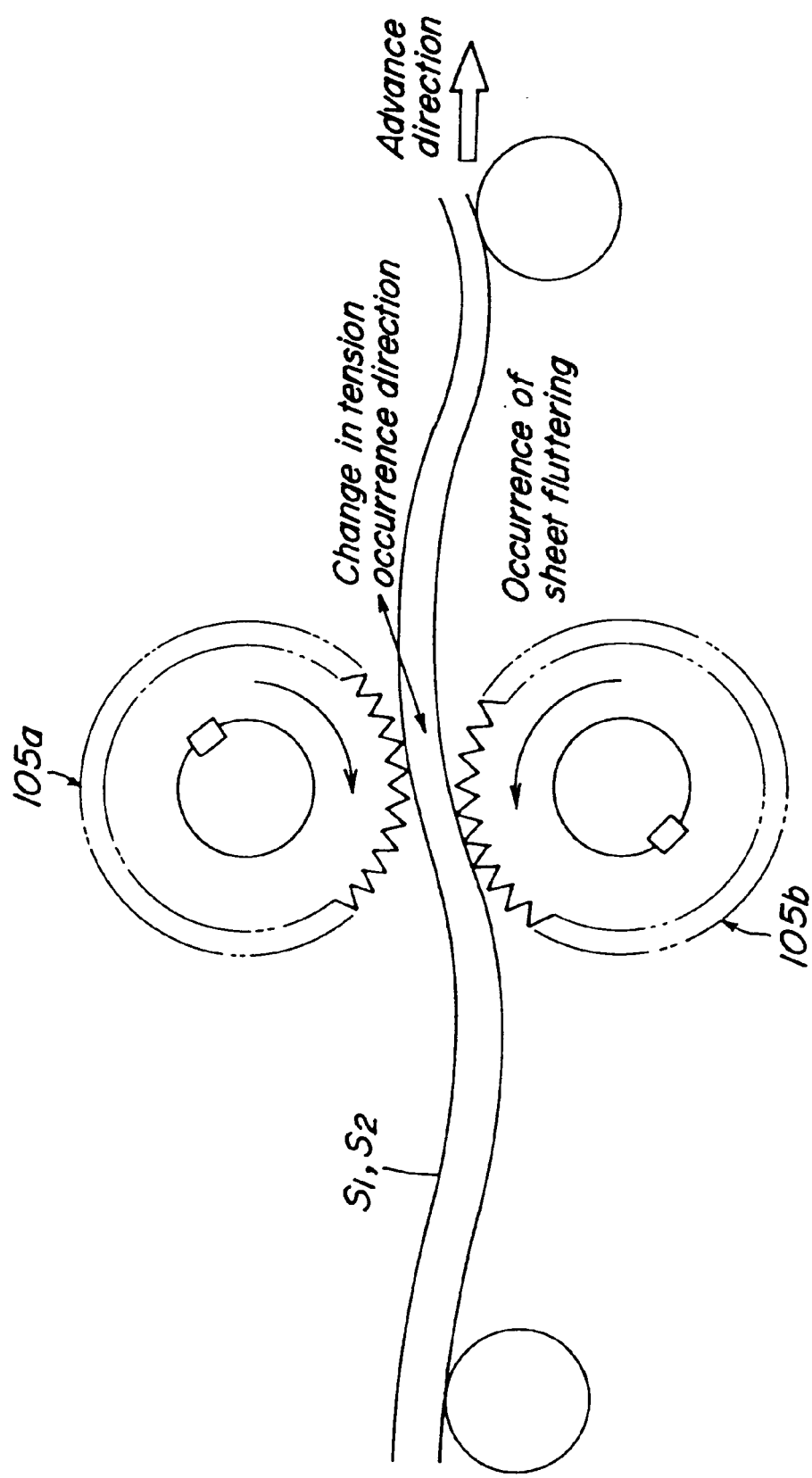
FIG. 39 is a view showing a state in which a steel product flutters during the cutting process.

In the apparatus having the movable sheet passing guides as shown in FIGS. 37 and 38, the problem of sheet passing caused by the deformation of sheet, especially the leading edge thereof, can be avoided well. During the cutting process of sheet, however, as shown in FIG. 39, when the sheet comes in contact with the cutting edges of the rotary drums 105a and 105b, the sheet sometimes is fluttered by the resistance. In such a case, there is fear of incapability of smooth cutting. Also, at the same time, the variation in sheet tension becomes large, which causes a great disturbance in terms of the sheet thickness variation in rolling or the tension control in the sheet joining process or coil box facility. Further, when the sheet flutters heavily, not only the cutting apparatus is damaged, but also the sheet interferes with the apparatus, by which the sheet surface is damaged, resulting in an adverse effect on the quality. In the present invention, especially as described in the above item 15), holding rolls or pinch rolls for restraining the tension variation caused by fluttering in the surface cutting of hot-rolled sheet are arranged on at least one of the input side and output side of the rotary drum, by which the damage to the apparatus and the quality deterioration of sheet are prevented.

Figure 40:
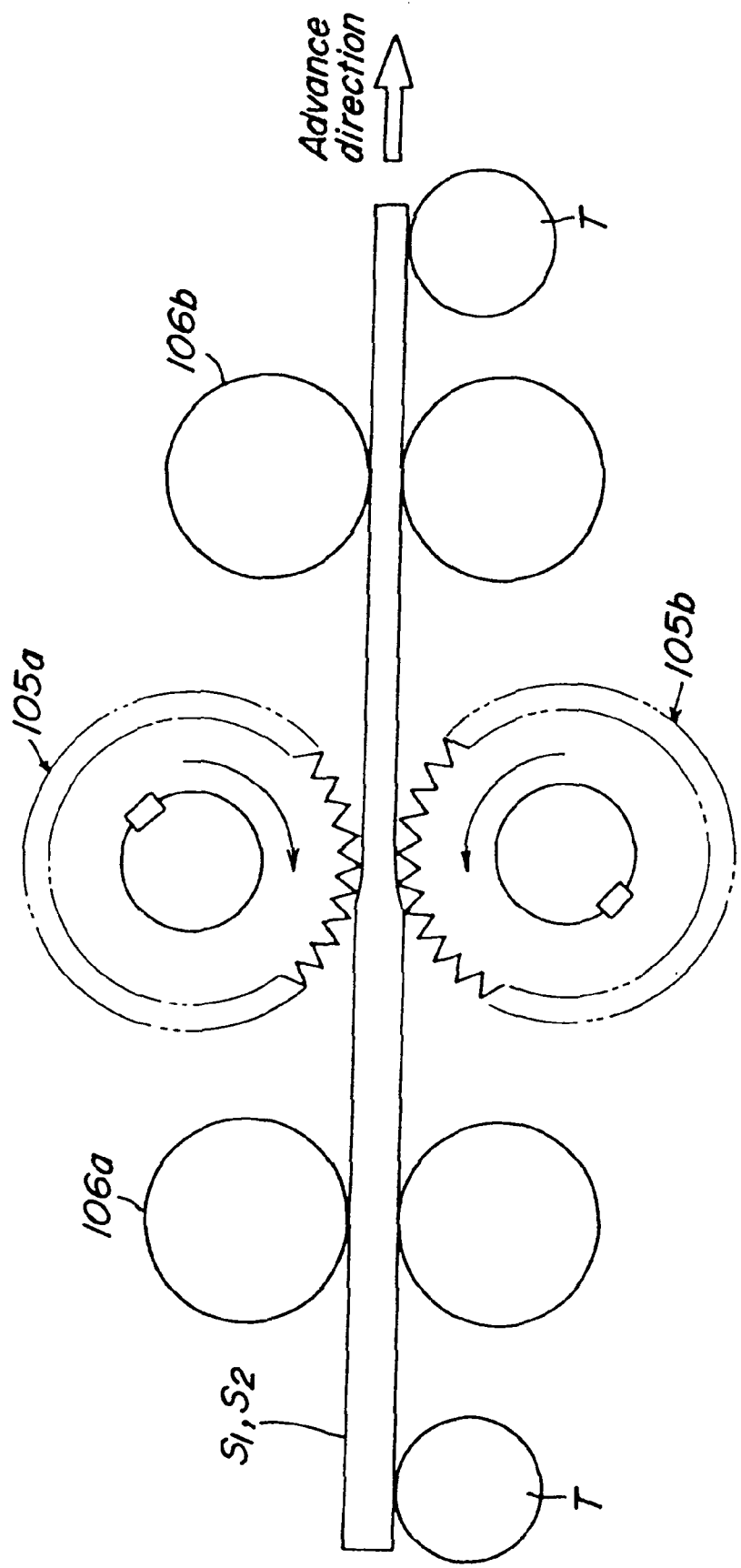
FIG. 40 is a view showing a basic configuration of an apparatus for restraining the fluttering of steel product during the cutting process.

FIG. 40 shows a basic configuration of an apparatus in accordance with the present invention. This figure shows, as an example, a case where pinch rolls 106a and 106b are installed between table rolls T on the input and output sides of the rotary drums 105a and 105b. Also, FIG. 41 shows, as an example, a case where holding rolls 107a and 107b, which can be moved vertically, are arranged just above the respective table rolls T on the input and output sides of the rotary drums 105a and 105b.

Figure 42:
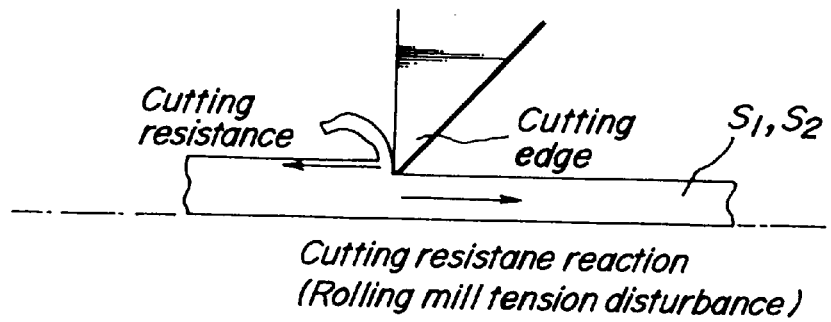
FIG. 42 is a view showing the relationship between cutting resistance and cutting resistance reaction in surface cutting of steel product.

In the above-described configuration, a sheet S is held by the pinch rolls 106a and 106b or the holding rolls 107a and 107b locally or in the whole range in the width direction on the input and output sides of the rotary drums 105a and 105b for cutting the sheet $S_1$, $S_2$. Therefore, the fluttering of sheet is decreased greatly, and uniform and smooth cut surface can be obtained. Also, as shown in FIG. 42, a stable tension variation is caused by cutting reaction only, so that the feedback on the rolling side can be performed by predicting the tension disturbance, and the resultant sheet thickness variation can be reduced.

Figure 41:
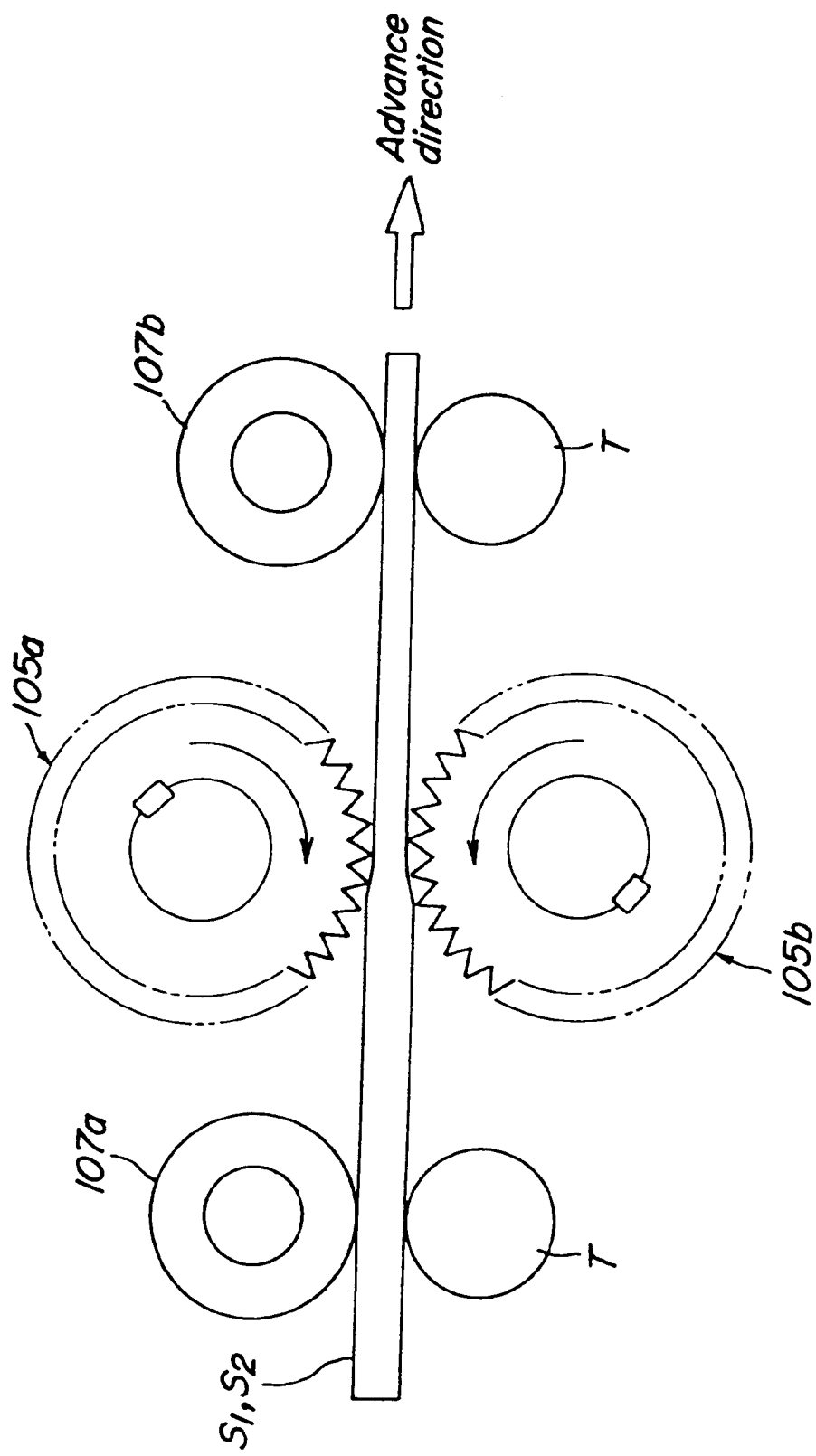
FIG. 41 is a view showing a basic configuration of another apparatus for restraining the fluttering of steel product during the cutting process.
Figure 43:
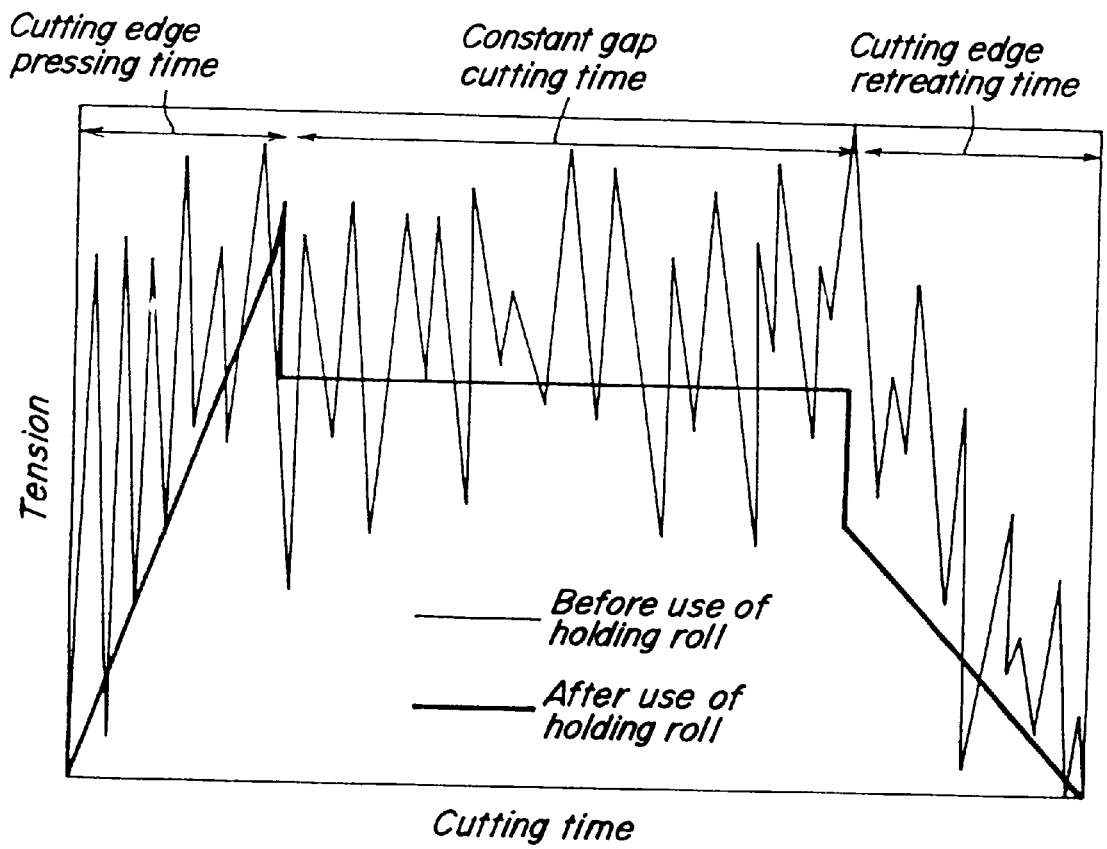
FIG. 43 is a diagram showing a comparison between the case where cutting is performed by holding down a steel product and the case where cutting is performed without holding down.

FIG. 43 shows a tension variation in the case where the sheet surface is cut by the rotary drums while the sheet is held by the holding rolls as shown in FIG. 41. When cutting is performed without holding the sheet, a large tension variation is caused irregularly. Contrarily, when the holding rolls are used, the tension variation is almost constant except for the cutting edge pressing time and retreating time.

The apparatus thus configured can be used for finishing strips, plates and slabs and for finishing sheets at the rough mill, as well as in the case where the projections at the joint portion are removed when a preceding sheet and a following sheet are joined and hot finish rolled continuously. For the specific apparatus, any of FIGS. 1, 4, 7, 10, 12 to 18, 22, 23, 24, 35, 37, 40, and 41 can be applied.

INDUSTRIAL APPLICABILITY

According to the present invention, the following effects can be expected.

1) When hot-rolled steel products having joint portions, especially a preceding sheet and a following sheet, etc. are surface-cut by using a milling cutter, the cutting resistance is controlled by the adjustment of cut depth, and the tension caused on the sheet by the cutting resistance is reduced to a value lower than the breaking strength of joint portion, by which the breakage is prevented. Therefore, the production efficiency in the subsequent hot rolling process can be improved.

2) A stable surface cutting can be performed for a long period of time, so that the cutting efficiency can be enhanced remarkably.

3) Since the rotary drum is configured by using a plurality of disks having cutting edges at the whole outer periphery, the rotary drum can be mounted and dismounted easily, so that the work efficiency can be improved. Also, only the disks in the range where wear proceeds and the life has been expired may be replaced, so that the cost of rotary drum can be reduced. Since the disks are fixed and held by expanding the main shaft, the disks can be mounted easily, and also the tolerance of fitting of the disks to the main shaft need not be set especially strictly, so that the disk design conditions can be relaxed. When the phase of cutting edges on the adjacent disks is shifted in the circumferential direction, and the cutting edges are arranged discontinuously in the axial direction, the length of chip produced by the sheet surface cutting can be decreased, so that there is no possibility of damage to cutting edges caused by the entanglement of chips. Further, only the rotary drum can be rotated by contracting the diameter of main shaft just when an excessive force is applied to the rotary drum, so that the damage to cutting edges or seizure of the main shaft and rotary drum does not occur.

4) The absolute position of cutting edge or grinding stone can be detected only by vertically moving the rotary drums and bringing the disks into contact with each other, so that zero adjustment can be made easily, and hot-rolled steel products can always be cut in the allowable range (a predetermined cutting allowance), by which the sheets of stable quality can be supplied for a long period of time. Also, the cutting edges or grinding stones installed at the outer periphery of the rotary drum are not brought into contact with each other, so that the damage to the cutting edge or grinding stone can be prevented. In particular, by using a measuring means, the wear state (wear deviation) of cutting edge or grinding stone in the direction along the rotary drum can be detected, and the replacement of cutting edge etc. following the increase in deviation by wear can be performed automatically, so that labor saving can be achieved.

5) The rotary drums having a width larger than the maximum sheet width are arranged above and below the hot-rolled steel product between the joining device and the finish rolling mill group, the upper rotary drum is supported by the chocks moved vertically by the screw down cylinder, the lower rotary drum is supported by the chocks moved vertically by the height adjusting cylinder, the upper chip discharge means having the flowing water injecting means is provided on the chip discharge side of the upper rotary drum, and the lower chip discharge means having the flowing water injecting means is provided on the chip discharge side of the lower rotary drum. Therefore, by moving the rotating cutting edges close to each other via the chocks by using the screw down cylinder and the height adjusting cylinder while rotating the rotary drums at a high speed, the projections between the tail edge of preceding hot-rolled steel product and the leading edge of following hot-rolled steel product jointed by the joining device is cut and removed by the pair of upper and lower rotary drums, and the chips scattered in the rotating direction by the high-speed rotation of rotary drums are accommodated in the upper and lower chip discharge means. The chips are cooled and allowed to flow down by the flowing water injected from the flowing water injecting means, and discharged. As a result, the projections on the top and bottom surfaces at the joint portion are removed at the same time by a continuous operation matching the advance of the steel product, and the adhesion of high-temperature chips to other equipment can be prevented.

6) In the case where continuous rolling is performed by installing the joining device for joining the tail edge of preceding hot-rolled steel product to the leading edge of following hot-rolled steel product between the rough rolling mill group and the finish rolling mill group, the rotary drums having a width larger than the maximum sheet width of rolled product are arranged above and below the steel product between the joining device and the finish rolling mill group, and the sheet passing guides are installed detachably between the lower rotary drum and the sheet passing plane for the steel product, so that the sheet passing guides are inserted between the upper and lower rotary drums when the preceding steel product passes between the rotary drums, and the leading edge of preceding steel product is passed to the output side by being guided by the sheet passing guides. After the leading edge thereof reaches the output side, the sheet passing guides are removed from between the upper and lower rotary drums, and before the joint portion between the preceding steel product and following steel product reaches the rotary drums, the upper and lower rotary drums are rotated and moved close to each other, by which the joint portion can be cut to a predetermined depth. As a result, the leading edge of preceding steel product can be prevented from hanging down or contacting with the apron etc., and the incapability of sheet passing can be eliminated completely.

b 7) The holding rolls or pinch rolls are installed on the input or output side of rotary drum to hold the sheet in cutting, by which the fluttering of steel product occurring in cutting the sheet is eliminated, and uniform and smooth cut surface can be obtained. Moreover, a tension variation is caused by cutting reaction only, so that the feedback in the rolling process can be performed by predicting the tension disturbance, by which the sheet thickness variation can be reduced. Also, since the fluttering of steel product does not occur, the flaws on the surface and the damage to the facility can be prevented.

We claim:

1. A surface cutting method for a hot-rolled steel product that includes a joint portion having a predetermined breaking strength, comprising the steps of:

clamping the steel product between a pair of milling cutters that are arranged on top and bottom surfaces of the steel product, while the steel product is conveyed in a longitudinal running direction;

subjecting the top and bottom surfaces of the steel product to cutting by rotating the milling cutters in a rotating direction;

determining a cutting resistance applied to the milling cutters during the cutting, based on parameters including type of steel, width, thickness, surface temperature and conveying speed of the steel product, as well as circumferential speed and cutting depth of the milling cutters; and controlling the cutting resistance by adjusting the cutting depth of the milling cutters using actuators connected to the milling cutters, such that a tension lower than the breaking strength of the joint portion is applied to the steel product by the cutting resistance, so as to prevent breakage of the joint portion during the cutting.

2. A surface cutting method for hot-rolled steel products according to claim 1, wherein a sudden temperature rise of the hot-rolled steel product is detected on an input side of the hot-rolled milling cutters, the hot-rolled steel product is held between the milling cutters based on the detected signal, and the surfaces of the joint portion including a nearby portion of hot-rolled steel product are cut.

3. A surface cutting method for hot-rolled steel products according to claim 1, wherein when the hot-rolled steel product running direction and the milling cutter rotating direction on the cut surface are reverse to each other, the adjustment of one-side cut depth t satisfies the following equation (1):

$$t \leq \sigma_b \cdot (b-2w) \cdot T / \{2 S_f C \cdot exp\ [A/(T_k+273)] \cdot b \cdot V_M / V_C + 2\sigma_b \cdot (b-2w)\} \quad (1)$$

where t: one-side cut depth (mm)

$S_f$: safety factor $\sigma_b$: strength of joint portion of hot-rolled steel product considering temperature (kgf/mm$^2$)

b: width of hot-rolled steel product (mm)

w: one-side unjoined length in the sheet width direction at joint portion of hot-rolled steel product (mm)

T: thickness of hot-rolled steel product (mm)

C: constant determined by the type of hot-rolled steel product (kgf/mm$^2$)

A: constant determined by the type of hot-rolled steel product (°C.)

Tk: temperature of hot-rolled steel product in cutting (°C.)

$V_M$: running speed of hot-rolled steel product (mm/s)

$V_C$: circumferential speed of milling cutter cutting edge (mm/s).

4. A surface cutting method for hot-rolled steel products according to claim 1, wherein when the hot-rolled steel product running direction and the milling cutter rotating direction on the cut surface are equal to each other, the adjustment of one-side cut depth t satisfies the following equation (2):

$$t \leq \sigma_b \cdot (b-2w) \cdot T / \{2 S_f C \cdot exp\ [A/(T_k+273)] \cdot b \cdot V_M / V_C\} \quad (2)$$

where t: one-side cut depth (mm)

$S_f$: safety factor $\sigma_b$: strength of joint portion of hot-rolled steel product considering temperature (kgf/mm$^2$)

b: width of hot-rolled steel product (mm)

w: one-side unjoined length in the sheet width direction at joint portion of hot-rolled steel product (mm)

T: thickness of hot-rolled steel product (mm)

C: constant determined by the type of hot-rolled steel product (kgf/mm$^2$)

A: constant determined by the type of hot-rolled steel product (°C.)

$T_k$: temperature of hot-rolled steel product in cutting (°C.)

$V_M$: running speed of hot-rolled steel product (mm/s)

$V_C$: circumferential speed of milling cutter cutting edge (mm/s).

5. A surface cutting method for hot-rolled steel products according to claim 1, wherein at least the cutting edges of a milling cutter are made of a ferrous material, and cooling water is sprayed to the cutting face or flank of said milling cutter at a pressure according to the rotating speed and outside diameter.

* * * * *